(12) United States Patent
Kiefer

(10) Patent No.: US 9,908,493 B1
(45) Date of Patent: Mar. 6, 2018

(54) UNDERRIDE GUARDS

(71) Applicant: Aaron J. Kiefer, Morrisville, NC (US)

(72) Inventor: Aaron J. Kiefer, Morrisville, NC (US)

( * ) Notice: Subject to any disclaimer, the term of this patent is extended or adjusted under 35 U.S.C. 154(b) by 0 days.

(21) Appl. No.: 15/244,166

(22) Filed: Aug. 23, 2016

Related U.S. Application Data

(63) Continuation of application No. 14/883,722, filed on Oct. 15, 2015, now Pat. No. 9,463,759.

(60) Provisional application No. 62/097,100, filed on Dec. 28, 2014, provisional application No. 62/072,136, filed on Oct. 29, 2014.

(51) Int. Cl.
  *B60R 19/56* (2006.01)
  *B60R 19/04* (2006.01)

(52) U.S. Cl.
  CPC ............. *B60R 19/56* (2013.01); *B60R 19/04* (2013.01); *B60R 19/565* (2013.01)

(58) Field of Classification Search
  CPC .... B62D 35/001; B62D 35/008; B60R 21/34; B60R 19/56; B60R 19/565; B61F 19/02
  USPC ............ 296/189.1–180.5; 180/903; 293/128, 293/102
  See application file for complete search history.

(56) References Cited

U.S. PATENT DOCUMENTS

| | | | |
|---|---|---|---|
| 4,060,268 A | 11/1977 | Page, Jr. | |
| 4,359,239 A | 11/1982 | Eggert, Jr. | |
| D269,423 S | 6/1983 | Waite | |
| 4,613,147 A | 9/1986 | Kjellqvist | |
| 4,877,266 A | 10/1989 | Lamparter et al. | |
| 4,988,258 A | 1/1991 | Lutz et al. | |
| D352,019 S | 11/1994 | Rivero et al. | |
| 5,507,546 A | 4/1996 | Holley | |
| 5,632,518 A | 5/1997 | Kendall | |
| 6,089,629 A | 7/2000 | Hope et al. | |
| 6,109,675 A | 8/2000 | Sumrall | |
| 6,116,667 A | 9/2000 | Torcomian | |
| 6,176,529 B1 | 1/2001 | Kitzmiller et al. | |
| 6,176,530 B1 | 1/2001 | Gollungberg | |
| 6,257,655 B1 * | 7/2001 | Selby .................. | B60P 3/08 296/186.2 |

(Continued)

FOREIGN PATENT DOCUMENTS

| | | | |
|---|---|---|---|
| DE | 3503656 A1 | 8/1986 | |
| DE | 9404592 | * | 3/1994 |

(Continued)

OTHER PUBLICATIONS

Southern Weaving Sling Webbing Products; Brochure; Souther Weaving; Greenville, SC; undated—printed Oct. 8, 2015.

*Primary Examiner* — Dennis H Pedder
(74) *Attorney, Agent, or Firm* — Leveque IP Law, P.C.

(57) ABSTRACT

An underride collision protection system for a truck. In one example, a rear bumper brace guard is attached to a truck body and extends a rear bumper toward and connects it to the side edge of the truck. A front panel bracket is also attached to the truck body. A fabric side underride guard panel has a front end and a rear end. The front panel bracket and the rear bumper guard hold the fabric side underride guard panel into place at the front end and rear end respectively. A stretching mechanism pulls the side underride guard panel taut between the front end and the rear end. This abstract is not to be considered limiting, since other embodiments may deviate from the features described in this abstract.

37 Claims, 12 Drawing Sheets

(56) References Cited

U.S. PATENT DOCUMENTS

| | | |
|---|---|---|
| 6,264,258 B1 | 7/2001 | Li et al. |
| 6,450,556 B1 | 9/2002 | Jacobs |
| 6,604,765 B1 | 8/2003 | Eull |
| 6,626,475 B2 | 9/2003 | Schroeder |
| 6,644,720 B2 | 11/2003 | Long et al. |
| 6,652,010 B1 | 11/2003 | Huddle et al. |
| 6,814,378 B1 | 11/2004 | Marmur |
| 7,086,674 B2 | 8/2006 | Goertz |
| 7,188,875 B2 | 3/2007 | Norelius |
| 7,407,204 B2 | 8/2008 | Eriksson et al. |
| 7,527,309 B2 | 5/2009 | Smidler |
| 7,530,612 B2 | 5/2009 | Regnell et al. |
| 7,699,382 B2 | 4/2010 | Roush et al. |
| 7,780,223 B2 | 8/2010 | Roush |
| 7,950,721 B1 | 5/2011 | Peterson |
| 7,954,884 B2 | 6/2011 | Kosaka |
| 7,967,349 B2 | 6/2011 | Puppini et al. |
| 8,025,330 B2 | 9/2011 | Reiman et al. |
| 8,162,384 B2 * | 4/2012 | Giromini ............ B62D 25/168 296/180.4 |
| 8,287,012 B2 | 10/2012 | Kokubo |
| 8,366,180 B2 | 2/2013 | Lee et al. |
| 8,376,450 B1 | 2/2013 | Long et al. |
| 8,562,019 B2 | 10/2013 | Ehrlich |
| 8,616,616 B2 | 12/2013 | Van Raemdonck |
| 8,727,425 B1 | 5/2014 | Senatro |
| 8,783,758 B2 | 7/2014 | Baker |
| 8,801,078 B2 | 8/2014 | Brown et al. |
| 8,950,793 B2 | 2/2015 | Deighton |
| 8,979,172 B2 | 3/2015 | Reiman et al. |
| 2003/0057736 A1 | 3/2003 | Long |
| 2006/0119116 A1 * | 6/2006 | Goertz ............... B60R 19/565 293/132 |
| 2008/0116702 A1 | 5/2008 | Enz et al. |
| 2013/0249233 A1 | 9/2013 | Yokouchi et al. |
| 2014/0028050 A1 | 1/2014 | Rodriguez |
| 2014/0300134 A1 | 10/2014 | Gerst |
| 2014/0333089 A1 | 11/2014 | Brown et al. |
| 2015/0197291 A1 | 7/2015 | Roush |
| 2015/0258951 A1 | 9/2015 | Wylezinski et al. |

FOREIGN PATENT DOCUMENTS

| | | |
|---|---|---|
| EP | 2845772 * | 9/2013 |
| JP | 2015004571 A | 3/2015 |

* cited by examiner

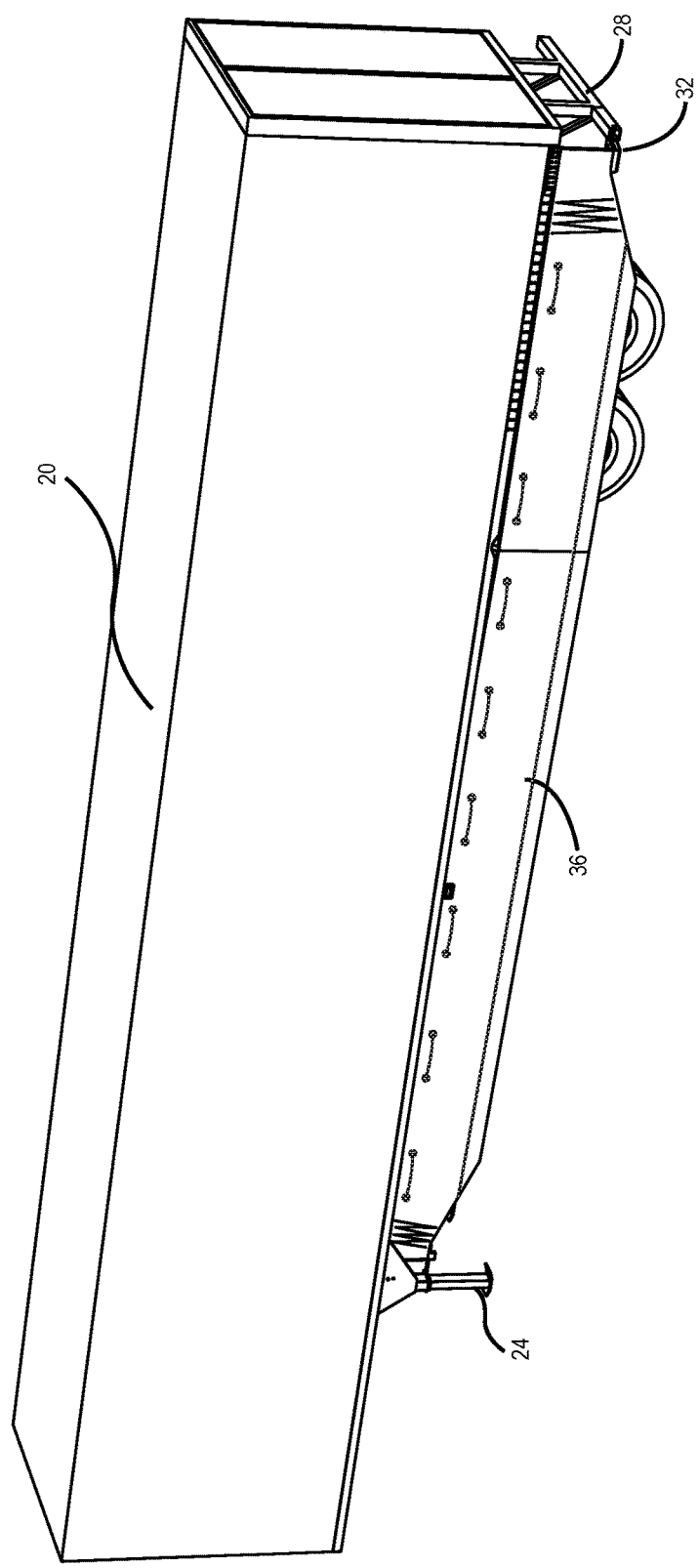

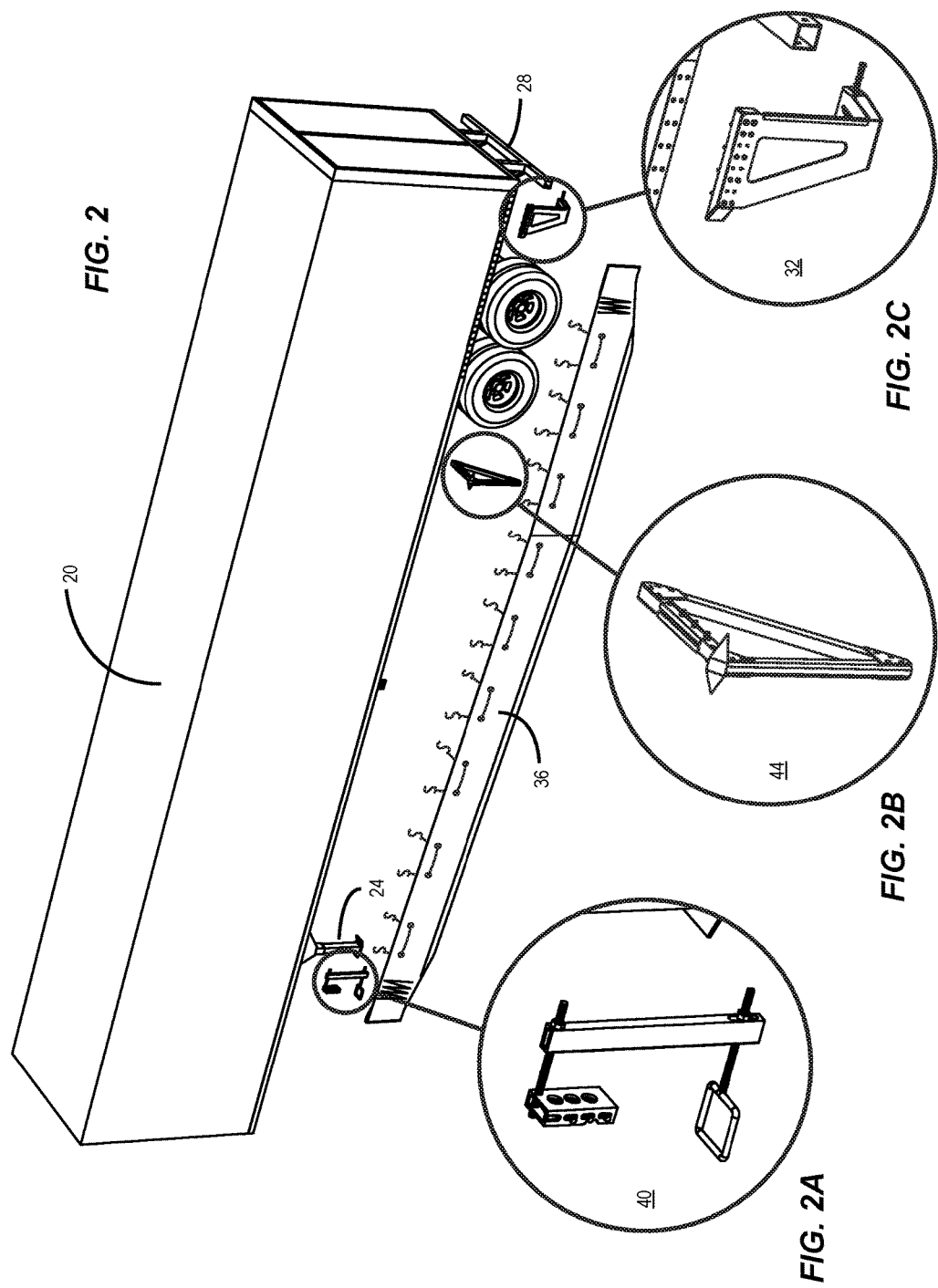

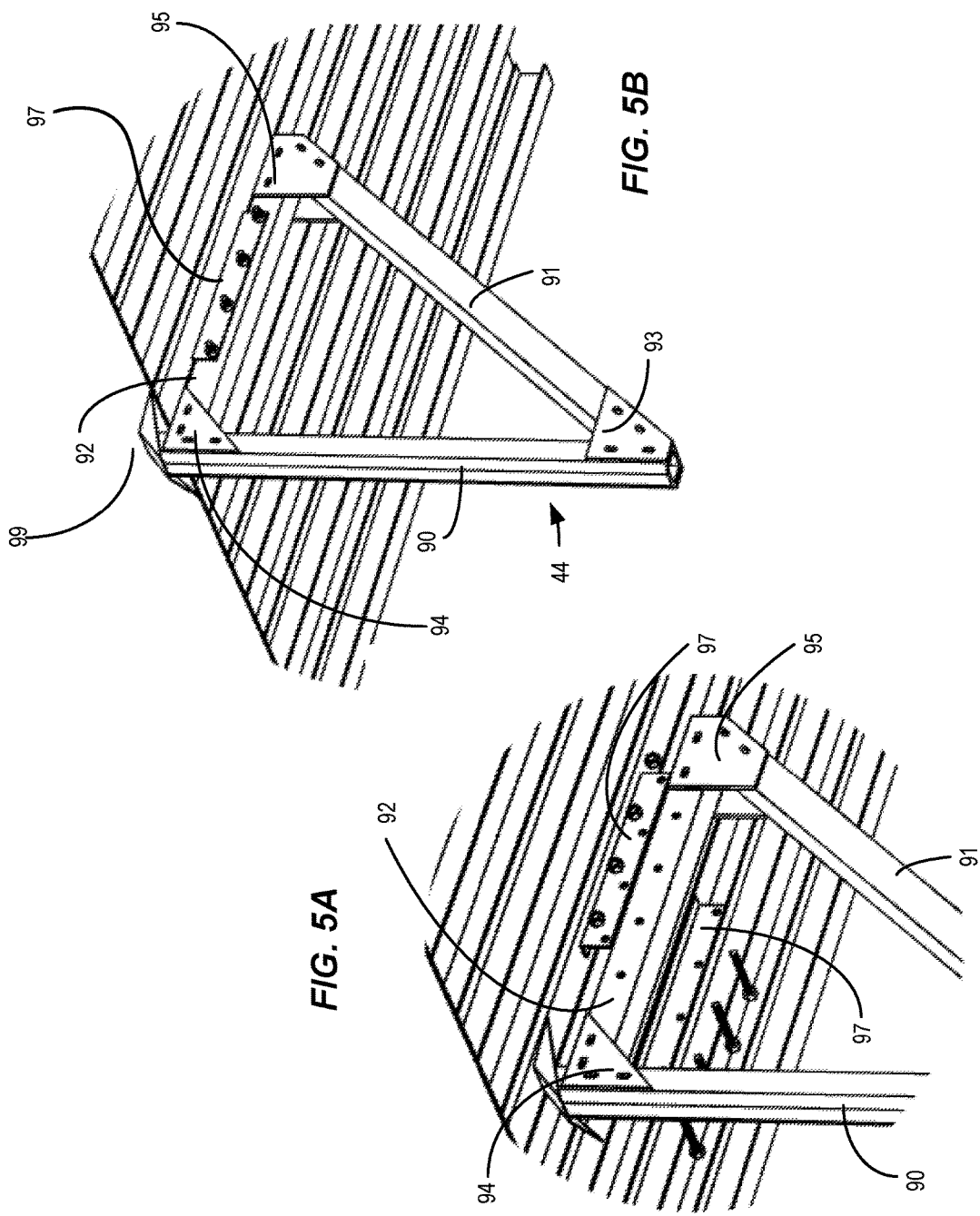

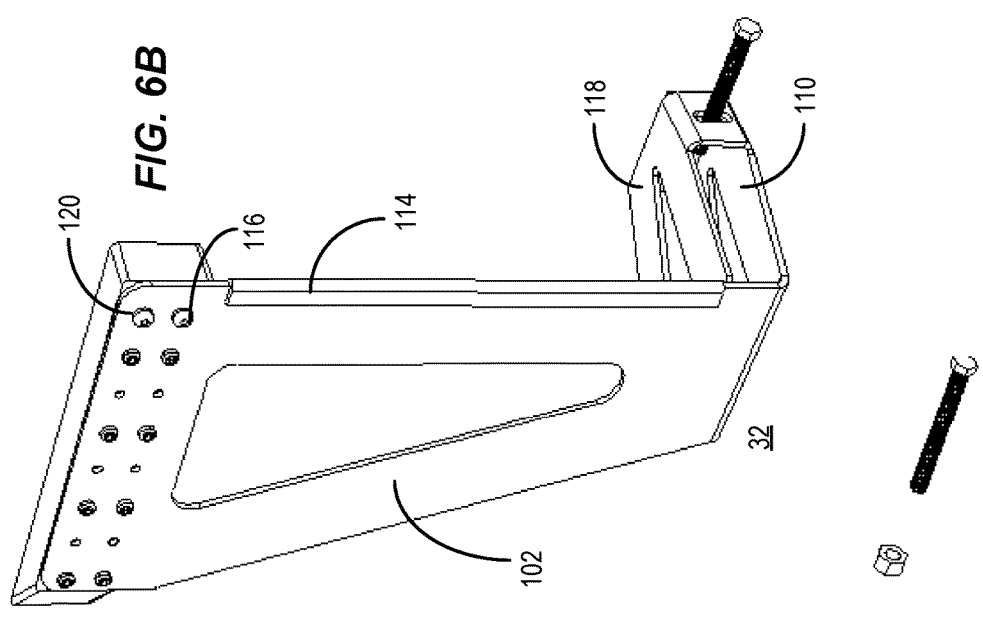
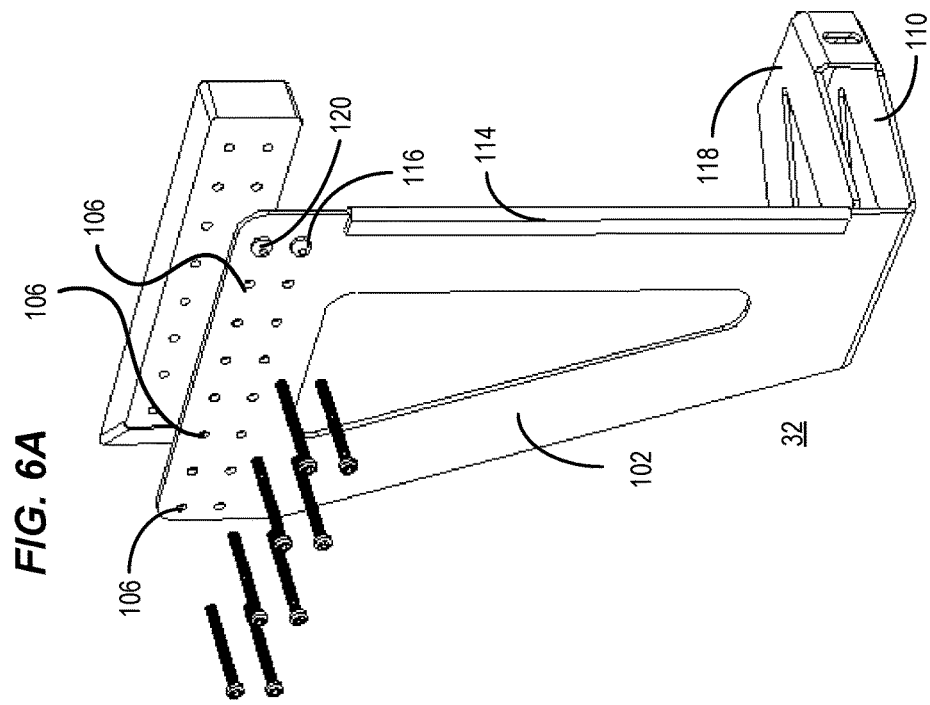

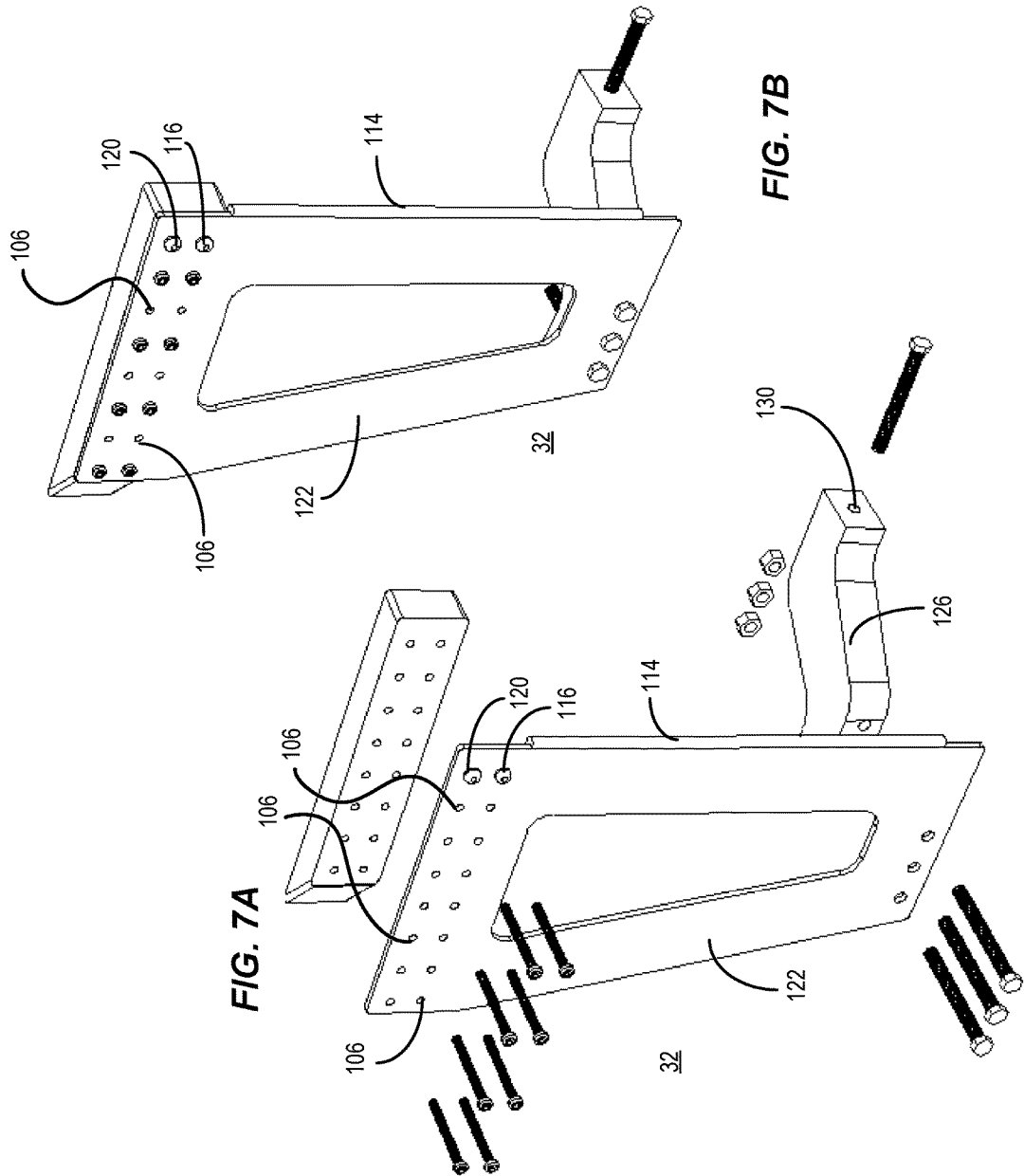

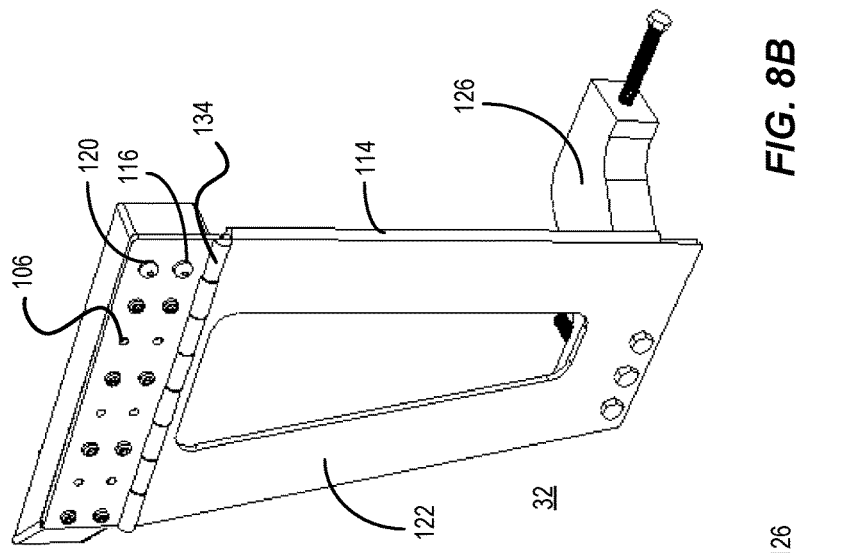
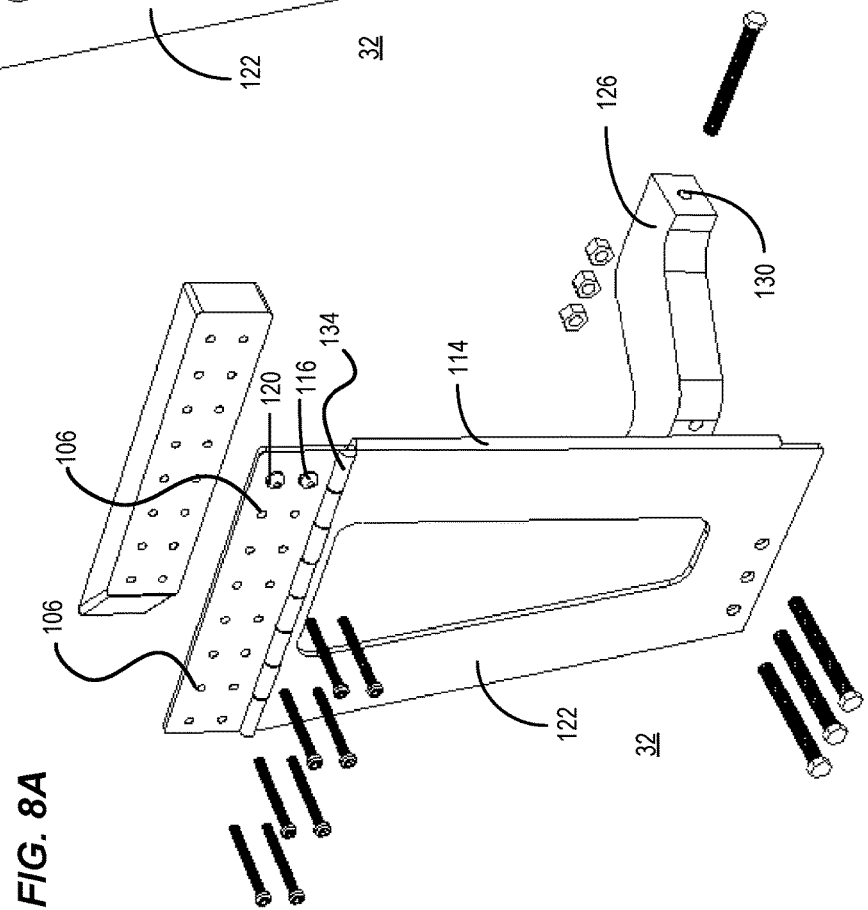

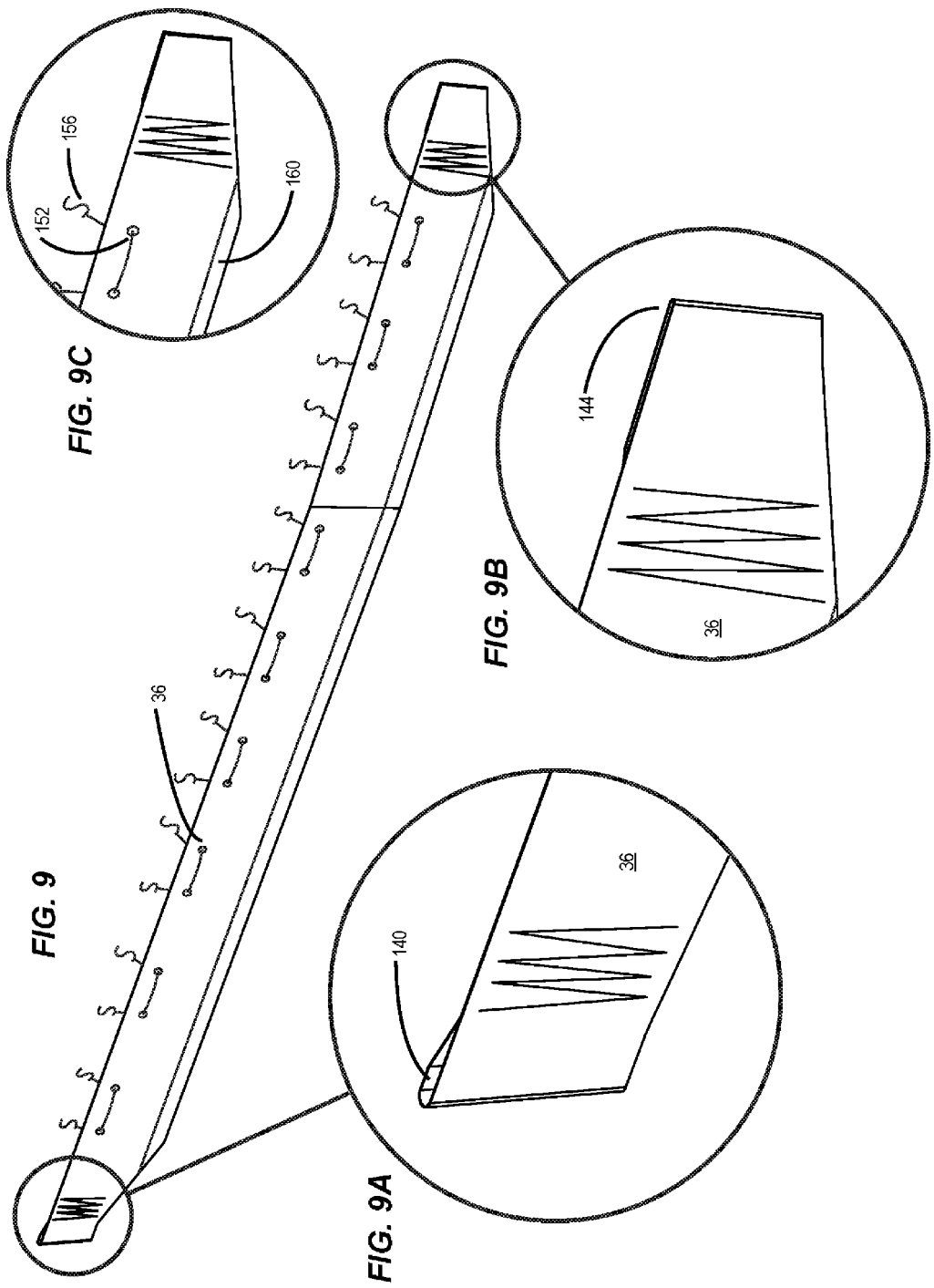

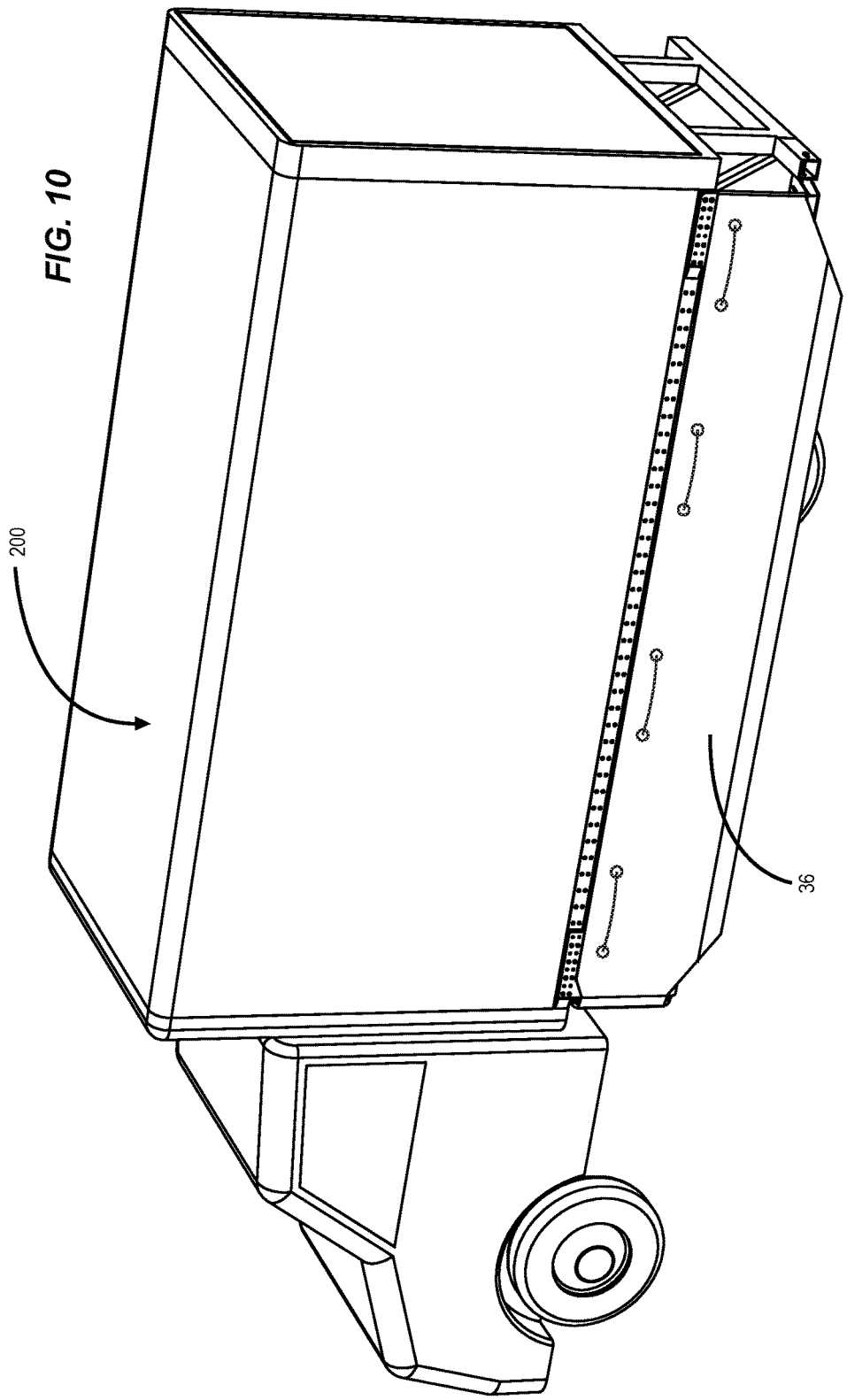

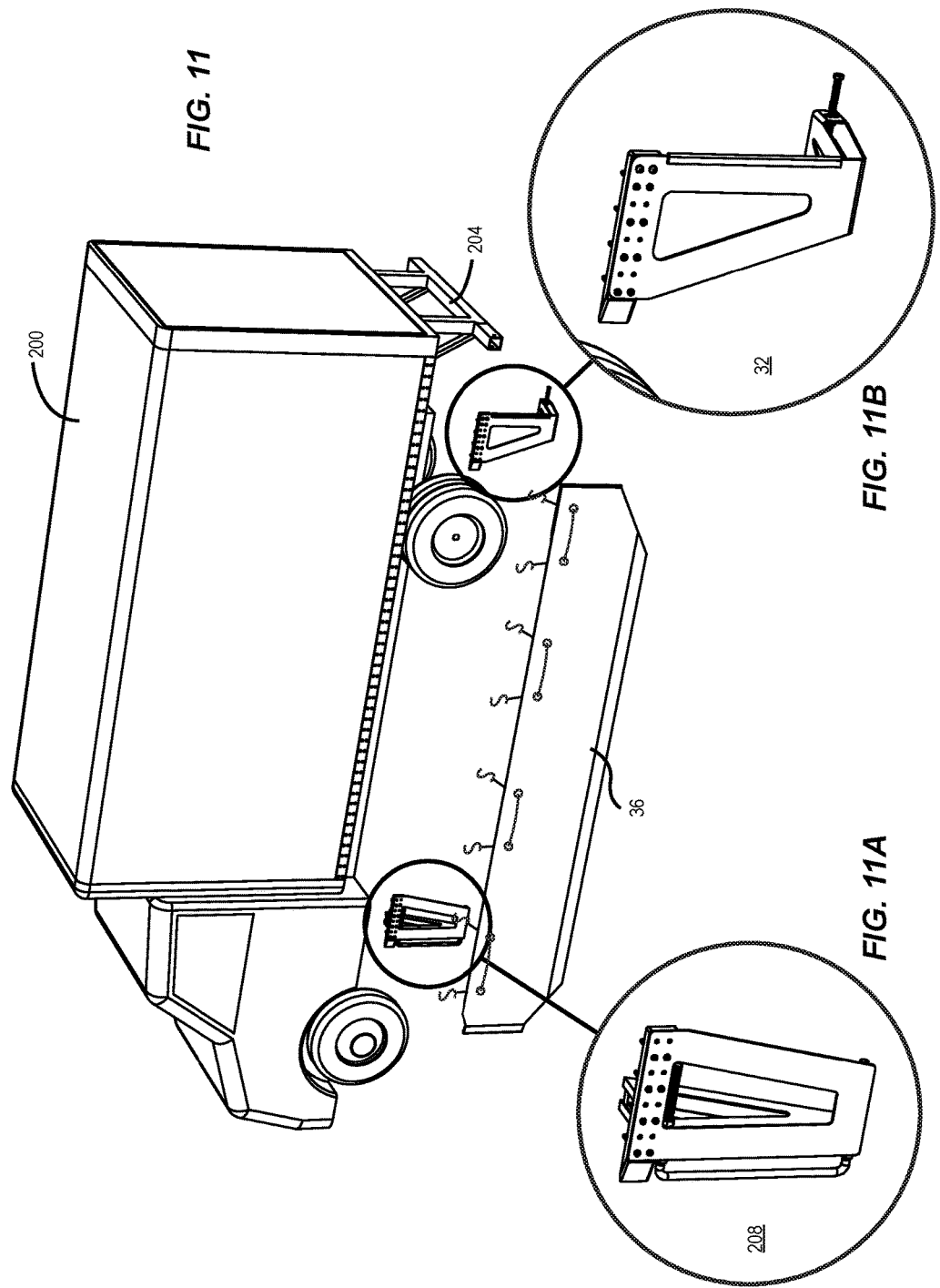

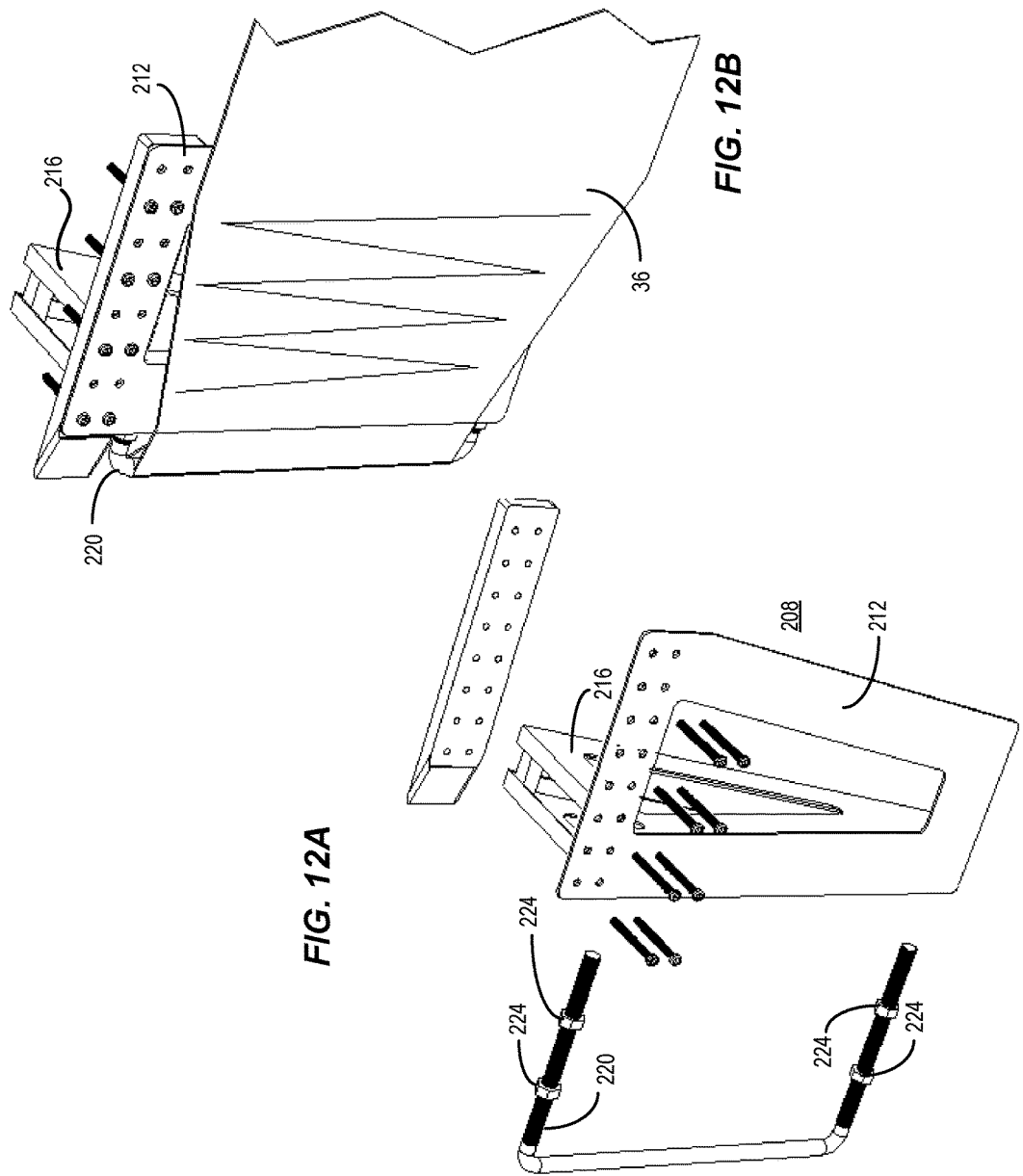

UNDERRIDE GUARDS

CROSS REFERENCE TO RELATED DOCUMENTS

This application is a continuation of allowed U.S. patent application Ser. No. 14/883,722 to Kiefer filed Oct. 15, 2015 and further claims priority benefit of U.S. Provisional Patent Application 62/097,100 filed Dec. 28, 2014 to Kiefer and U.S. Provisional Patent Application 62/072,136 filed Oct. 19, 2014 also to Kiefer, each of which is hereby fully incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Underride type collisions are vehicular collisions in which a passenger vehicle or pedestrian collides with a larger vehicle such as a tractor-trailer truck or a single unit truck (SUT) in which the pedestrian or passenger vehicle moves to a position beneath the larger vehicle which is generally higher from the ground than most passenger vehicles. This type of collision can result in passenger compartment intrusion (PCI) into the smaller vehicle which often results in severe and/or fatal injuries to occupants of the passenger vehicles. In addition, pedestrians or bicyclists may become entrapped beneath a truck and come into contact with the wheels or underbody of the vehicle. Underride collisions can also occur when a passenger vehicle hits a rear bumper of a larger vehicle causing the rear bumper to collapse and allowing the passenger vehicle to move forward under the larger vehicle (e.g., under the rear of a commercial truck or trailer). In any case, the consequences of this type of accident are dire.

Currently, commercial trucks and trailers utilize so called "D.O.T. dock bumpers" or "underride protection bumpers" which are intended to prevent underride of a smaller vehicle from the rear. However, these bumpers have been shown to be inadequate—especially when a smaller vehicle collides with the commercial truck or trailer near either end of the bumper. Often these bumpers collapse or buckle or break on collision and fail to provide adequate protection against underride. In addition, commercial vehicles sold and operated in North America are not currently regulated for side impact guarding.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings.

FIG. 1 is an illustration of a commercial trailer with installed underride protection devices consistent with certain example embodiments of the present invention.

FIGS. 2, 2A, 2B and 2C, illustrate a detailed breakdown of one example embodiment consistent with examples of the present invention.

FIGS. 5A-5B are exploded and assembled illustrations respectively of a central brace consistent with certain example embodiments of the present invention.

FIGS. 6A-6B are exploded and assembled views of a Rear Bumper Brace Gusset (RBBG) consistent with certain example embodiments of the present invention.

FIGS. 7A-7B are exploded and assembled illustrations respectively of an alternative design of a RBBG consistent with certain example embodiments of the present invention.

FIGS. 8A-8B are exploded and assembled illustrations respectively of a further alternative design of a RBBG consistent with certain example embodiments of the present invention.

FIGS. 9, 9A, 9B and 9C are illustrations of a side underride guard panel consistent with certain example embodiments of the present invention.

FIG. 10 is an illustration of side and rear underride guards installed in a SUT in a manner consistent with certain example embodiments of the present invention.

FIGS. 11, 11A and 11B depict a breakdown of the components used in the SUT embodiment in a manner consistent with certain example embodiments of the present invention.

FIGS. 12A-12B show exploded and assembled views of a front brace that is adapted for use in a truck having no landing gear consistent with certain example embodiments of the present invention.

GLOSSARY

Figure 3B:
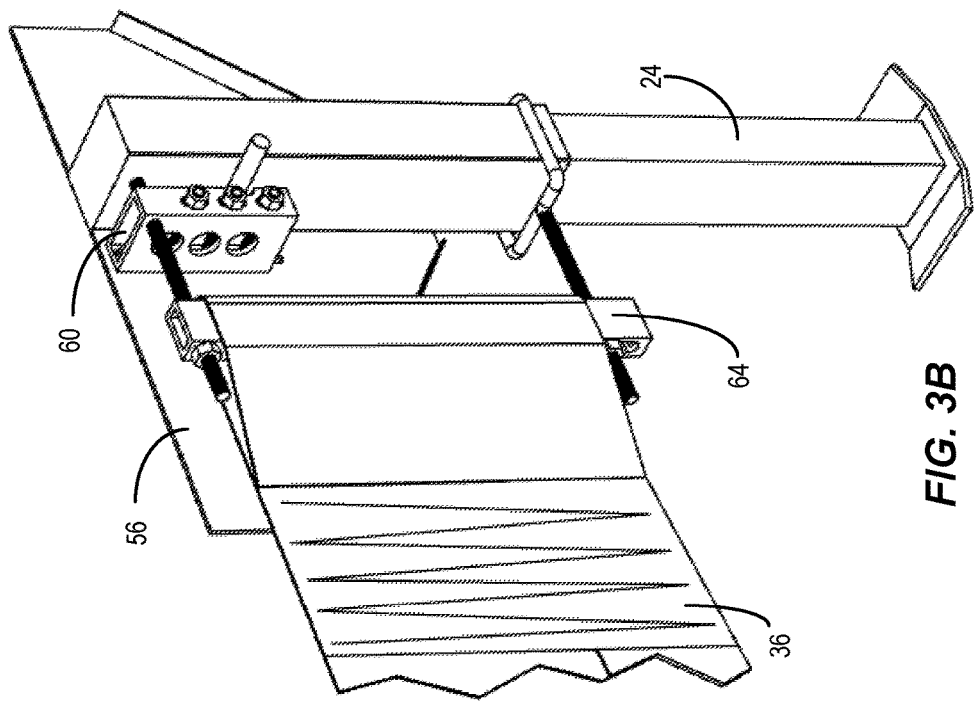
FIGS. 3A-3B provide an illustration of a front panel holder in exploded and assembled form respectively in a manner consistent with certain example embodiments of the present invention.

Reference throughout this document to "one embodiment", "certain example embodiments", "examples", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "a" or "an" or "the", as used herein, are defined as one or more than one.

The term "plurality" and "multiple", as used herein, is defined as two or more than two.

The terms "including" and/or "having" and/or "has", as used herein, are defined as comprising (i.e., open language).

The verb "is" should be considered open ended language that refers to an example, such that the term "A is a B" means that A is an example of something that can be used as B.

The term "coupled", as used herein, is defined as connected, although not necessarily directly.

The word "about" or "approximately" or "around" when accompanying a numerical value is to be construed as indicating a deviation of up to and inclusive of minor deviations from the stated numerical value, for example, in many instances within up to about 5-7%.

The use of any and all examples, or language indicating a example ("e.g." or "such as" or "for example") provided herein, is intended merely to better illuminate the invention and does not pose a limitation on the scope of the invention unless otherwise explicitly claimed. No language in the specification should be construed as indicating any non-claimed element as essential to the practice of the invention.

The term "truck" as used herein is intended to generically mean either a single unit truck with an elevated body such as a "box truck", or the trailer of a tractor-trailer truck (i.e., a semi-trailer). Hence a "rear truck bumper" means either a rear bumper attached to a truck or attached to the rear of a trailer designed for pulling by a tractor truck. It follows that the term "truck body" can mean either the body of a truck itself or the body of a trailer designed for pulling by a tractor truck.

The term "gusset" as used herein means a corner brace. In particular, the term is used to describe a brace that extends from the side of a truck to a rear underride protection bumper to enhance the strength of the bumper, especially near the left and right edges thereof.

The term "flexible" is used herein in connection with the side underride guard panel. This term means that the panel is foldable, rollable or otherwise flexible within a conventional use of the term, but only requires that the panel be flexible enough to deflect adequately so as to bend around the central brace and flexible enough to be positioned within the holding mechanisms provided at the front and rear of a truck. After the panel is coated and/or laminated for ultraviolet and other protection, it may become somewhat rigid, but if it meets the above minimum criteria, it is considered flexible within the meaning of the term as used herein.

The terms "cloth" and "fabric" as used herein is intended to have the meaning that would be common in the industrial fabric or textile industry to mean a flexible sheet of material that is woven, knitted, felted or unwoven or includes woven, knitted, felted or unwoven thread or fiber elements.

DETAILED DESCRIPTION

While this invention is susceptible of embodiment in many different forms, there is shown in the drawings and will be herein described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

As noted above, the standard bumpers in current use for inhibiting rear underride collisions have been shown to be inadequate. This is particularly the case for protection against collisions at each side (left and right) of the bumper. In addition, semi-trailers and SUTs sold in North America usually have rectangular bodies whose lower edges are 3-4 feet above the ground. Despite the hazards presented by the lower edge of the truck bodies and the open areas beneath these bodies, there are no requirements for guards or other devices to be fitted beneath or alongside the truck body. The unguarded areas beneath trucks present hazards to motorists, cyclists, and pedestrians.

The present invention, in accord with certain illustrative example embodiments, relates to a reinforcement and guarding system designed to be fitted to truck bodies and underride protection bumpers and which enhances underride protection in side and rear collisions.

In the United States, federal motor vehicle safety standards have required rear underride prevention guards on trucks and semi-trailers sold in the United States for some time. However, there are no corresponding standards for the sides of trucks and semi-trailers. Research shows that over 3,000 fatal passenger vehicle—commercial vehicle accidents currently occur annually in the United States. The applicant is not aware of consistent data describing how many of these collisions are underride type accidents. Some sources indicate that approximately 27% of fatal collisions involved underride while others indicate that the rate may be over 80% (SAE 2003-01-0178). Fatal pedestrian and bicyclist collisions with commercial vehicles are not shown in the above numbers and are far too common, especially in urban environments where unguarded truck bodies pose serious hazards. The National Highway Traffic Safety Administration (NHTSA) estimates that over 300 passenger vehicles are involved in fatal rear end collisions with SUTs and trailers annually. Despite the uncertainty in the data, it is clear that side and rear underride accidents are a major hazard to the public.

Federal Motor Vehicle Safety Standards (49CFR 571.223 and 571.224) indicate geometric and force-energy performance standards for rear underride guards on truck tractors and semi-trailers. 49CFR 393.86 governs guard size and position for non-articulated trucks and vocational vehicles but does not specify energy absorption criteria. These standard and practices have resulted in similar two post steel rear guards being employed by the majority of truck manufacturers in the United States.

Testing by the Insurance Institute for Highway Safety and other entities has shown that rear truck guards manufactured to meet FMVSS standards do not prevent severe underride type collisions. In particular, partial overlap tests by the Insurance Institute for Highway Safety (IIHS) have shown serious deficiencies in guard strength, stiffness, and energy absorption. This problem is addressed in accord with the present teaching by use of strengthening retrofit assemblies that may be installed directly onto existing truck underride guards. Such assemblies can also be simplified for provision as original equipment for trucks.

Many of the underride guards currently in use (and that are in compliance with federal standards) are unable to prevent passenger vehicle underrides—even at relatively low closing velocities. The same closing velocities that cause rear guard failure and passenger vehicle underride in testing are often survivable if frontal vehicle structure is engaged in the collision as modern vehicles are capable of managing a large amount of crash energy while minimizing the potential for occupant injury. Unfortunately, the geometry of trucks is such that passenger vehicles bumpers and energy absorbing bodies may pass entirely beneath the side of a commercial vehicle without resistance. The underriding vehicle's occupant compartment or 'greenhouse' often contacts the side or rear of the truck with catastrophic results.

Research indicates that side intruding passenger vehicles may pass entirely beneath a truck body (shearing the occupant compartment off) at speeds as low as 35 mph.

Current 49CFR 571.223/224 standards (which are more stringent than 49CFR 393.86) mandate a minimum guard height of 560 mm (22 inches) above the ground, a minimum vertical height of 100 mm (3.93 inches) for the horizontal member of the guard, a position not more than 305 mm (12 inches) forward from the rear of the vehicle, and outboard extents to within 100 mm (3.93 inches) to the sides of the vehicle (when installed on a trailer or semi-trailer with GVWR of 4,536 kg or more). The standards require that guards absorb at least 5,650 Joules while deflecting no more than 125 mm (4.92 inches) while subject to loadings at multiple locations. Quasi-static loading is specified as following in the standards: 50,000 N at the central position and a location ⅜ of the guard length from the central position and 100,000 N at 3/16 of the length from the central position.

With some minor variation, the geometric and performance standards have resulted in similar rear underride guards being employed by the majority of truck manufacturers in the United States. Guards that meet or exceed federal standards (and other North American standards as well) often do not have the strength to resist collision loading depending on the collision location and offset percentage. It has been found that underride guard bumpers usually fail at the attachment point between the guard horizontal and vertical members or near the collision location (especially if the collision is offset to one side of the guard). A third, and relatively less likely, failure may occur between the guard structure and the truck or trailer body if the guard is sufficiently robust to transfer forces and the anchor locations are not properly reinforced and/or directed to the truck structure.

Embodiments consistent with the present teachings overcome the failure modes of rear guards and side impact hazards presented by truck bodies. Example embodiments of the present system strengthen the existing rear underride guards via attaching reinforcing components to direct collision forces into substantial truck frame structure. The devices are designed to allow a retrofitted guard to withstand forces associated with full overlap and 50% and 30% partial overlap rear end impacts from passenger vehicles at reasonable closing velocities without failure. In addition, example systems help to prevent side intrusion by a tensioned fabric side panel mounted at front and rear to significant truck structure.

In accord with certain embodiments, device(s) may be developed as a retrofit kit (or adapted for inclusion as original equipment) and may include a single assembly or multiple components that directly attach to the guard and to the truck structure that are not otherwise connected. The device(s) may also be constructed from bolted, welded or otherwise connected subassembly(s) to form one or more bodies that connect to the underride guard, the landing gear, and to the truck body. Such devices can be designed and manufactured in multiple configurations to accommodate direct fitment onto trucks of varying size shape and purpose.

The device(s) may have components that connect to current truck body or guard structure(s) that extend along the sides of the vehicle enclosing the rear axle(s). These components serve to inhibit or prevent side underride collisions and to enhance aerodynamics by reducing turbulent drag and/or vacuum drag that may exist beneath the truck or around the rear axle(s) and body in addition to preventing rear underride collisions. Portions of the devices described herein may be manufactured from industrial fabric materials, aircraft grade aluminum, high strength steel, fiber reinforced composite or other material via techniques utilized to construct structural components. In accord with the present teachings, the devices preferably should not hinder docking of trucks or trailers nor should they hinder freight loading or ingress/egress to the truck. Installation of the devices should preferably not affect adjustment of the rear axle position. Modifications to the general embodiment(s) described herein may be performed to enable fitment of underride prevention device(s) onto vocational SUTs such as dump body trucks, refuse haulers, lift gate trucks, or other vehicles that pose underride hazards but may rely on non-standard body or rear guard designs. The devices may be designed and installed so as not to significantly alter the dimensions of the vehicle other than to potentially extend the width of the vehicle within a non-property carrying tolerance or to increase the height or width of the existing rear underride guard. Many variations will occur to those skilled in the art upon consideration of the present teachings.

Thus, a system for preventing or minimizing underride and related injuries in collisions between passenger vehicles, pedestrians, motorcycles, and bicycles with trucks is provided. The system, in one example, has a rear bumper brace gusset (RBBG) attached to a truck body and extends a rear bumper toward and connects the rear bumper to the side edge of the truck. A front panel bracket is also attached to the truck body. A fabric side underride guard panel (SUGP) has a front end and a rear end. The front panel bracket and the RBBG hold the fabric SUGP into place at the front end and rear end respectively. A stretching mechanism pulls the side underride guard panel taut between the front end and the rear end.

Turning now to FIG. 1, an example embodiment of a commercial semi-trailer 20 carrying side and rear underride protective devices consistent with the present teachings is depicted. Such trailers 20 commonly incorporate a 'landing gear' device 24 near the front to support the trailer 20 when not attached to a tractor. A rear bumper 28 is typically shaped somewhat like an upside down Π symbol. Rear bumper 28 is intended to prevent or reduce underride and associated passenger compartment intrusion (PCI) in a rear-end collision, but without modification has been found to do a poor job at this (as discussed above). In the present illustration, a RBBG 32 is provided which serves two functions 1) reinforcement of the bumper structure, especially the corners of the rear bumper; and 2) serves as a support for the rearmost portion of a side underride guard panel (SUGP) 36. In certain implementations, the rear element can be configured to only serve as either a rear bumper reinforcement or a panel mount for attachment of the side underride guard panel. The SUGP 36 is positioned and braced and guided around the rear axle(s) with one or more central braces 44 and terminates in the front near the landing gear 24. The side underride guard panel will be discussed in greater detail later, but is generally a high strength flexible fabric panel that is held in place and pulled tightly at a front panel holder 40 (hidden in this figure). In certain embodiments, this front panel holder 40 is attached to either the truck or trailer body or to the landing gear 24.

The SUGP 36 inhibits underride of vehicles, pedestrians, bicycles, motorcycles, etc. in a collision with the side of the truck. The SUGP 36 does not have "catch points" that may snag or carry a vehicle, pedestrian, or cyclist potentially causing injury. In addition, the SUGP 36 reduces the aerodynamic drag along the side and undercarriage of the truck to which it is attached.

It will be clear to those skilled in the art upon consideration of the present teachings that the present underride guard arrangement in its various embodiments can be provided as a retrofit kit or can be adapted to be a part of the truck original equipment without limitation. Further, the assemblies described can be provided as original equipment rather than as retrofit. When provided as original equipment, the various assemblies that are bolted on (e.g., bolted to a landing gear assembly) can be more permanently mounted as cast, formed, welded, or bolted structures forming a more integral part of the various assemblies, as will be clear to those skilled in the art upon consideration of the present teachings.

The assembly of FIG. 1 is depicted in greater detail in FIG. 2 including the breakout illustrations FIG. 2A-2C. In this example, the front panel holder 40 attaches to the landing gear assembly 24 at a top bolted connection of the landing gear and slides around the leg of the landing gear assembly 24 as shown in greater detail in FIG. 3A. The front panel holder has a lower threaded member 48 which terminates in a rectangular opening 50 that slides around the lower portion of the leg of the landing gear assembly 24. An upper threaded member 52, in this example, is bolted to an upper brace member 56 of the landing gear assembly at a box-like bracket 60. In this example, the box-like bracket has openings for a series of bolts that pass through the brace member 56 and the box-like bracket 66 to hold the box-like bracket 60 flush in contact with the brace 56 and an upper portion of the leg of landing gear 24. The upper and lower threaded members 48 and 52 pass through a segment of rectangular metal stock 64 which is secured in place by a pair of nuts.

Figure 3A:
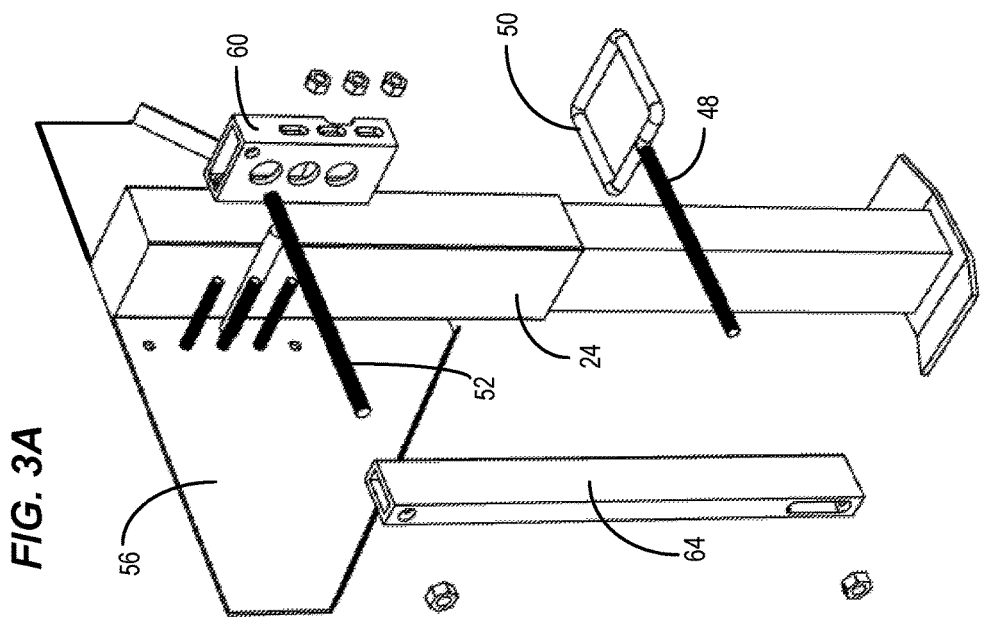

Referring to FIG. 3B, the segment 64 is shown passing through a looped end of the SUGP 36 to hold the SUGP 36 in place. The tension applied to the SUGP 36 is provided and adjusted by tightening nuts to pull the segment 64 toward the leg of the landing gear assembly 24. While element 64 is shown as being made from rectangular stock, this should not be considered limiting since the profile is not critical so long as the profile is not one that tears or cuts the SUGP 36. In this example, the box-like bracket 60 can be fabricated from a segment of rectangular metal stock which is drilled appropriately as shown and which has a threaded rod otherwise attached thereto. In this illustration and in illustrations appearing throughout this document, washers, lock-washers, jam nuts, locknuts and the like are not shown to simplify the illustrations, but may be used where applicable.

By way of example and not limitation, if the design depicted in FIG. 3B were to be adapted to use as original equipment, the design can be simplified by having threaded rods bolted or welded or otherwise formed in place or attached directly to the upper and lower leg of the landing gear assembly 24 without need for the intermediate bracket assembly 60 or the rectangular opening of element 50. This simplifies the design and allows for easy production of a suitable original equipment design and is contemplated by the present discussion. Many variations will occur to those skilled in the art upon consideration of the present teachings without deviating from the spirit and broad scope of the present inventive concepts.

Figure 4B:
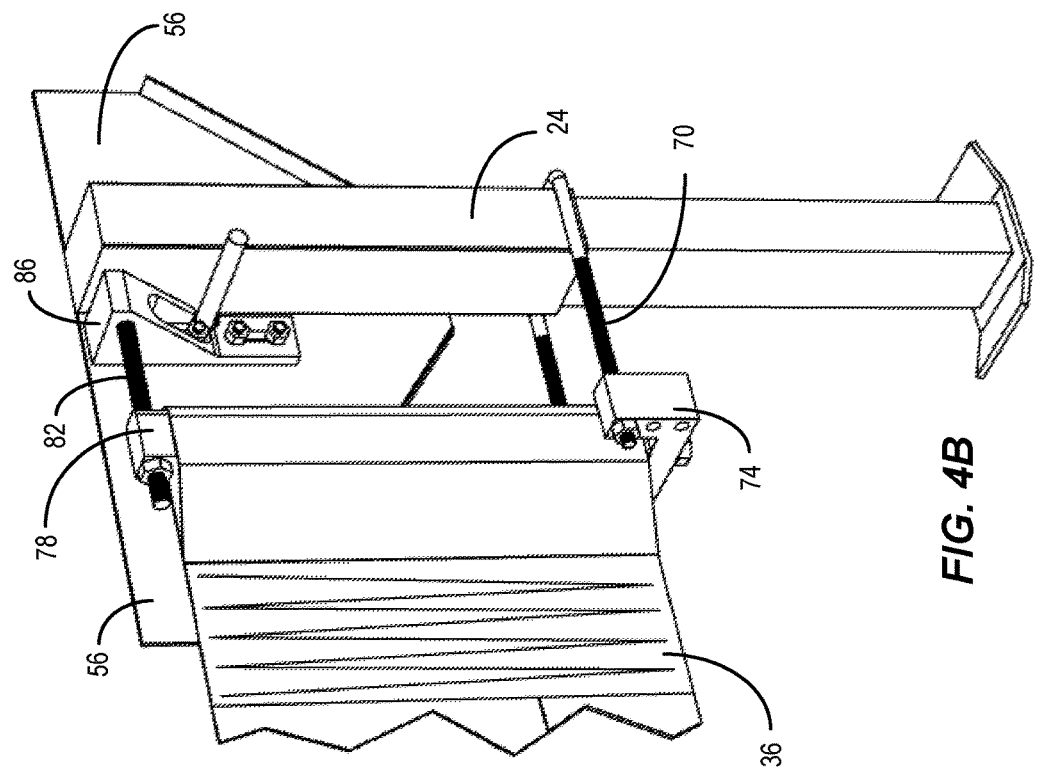
FIGS. 4A-4B depict another example implementation of a front panel holder in exploded and assembled form respectively in a manner consistent with certain example embodiments of the present invention.
Figure 4A:
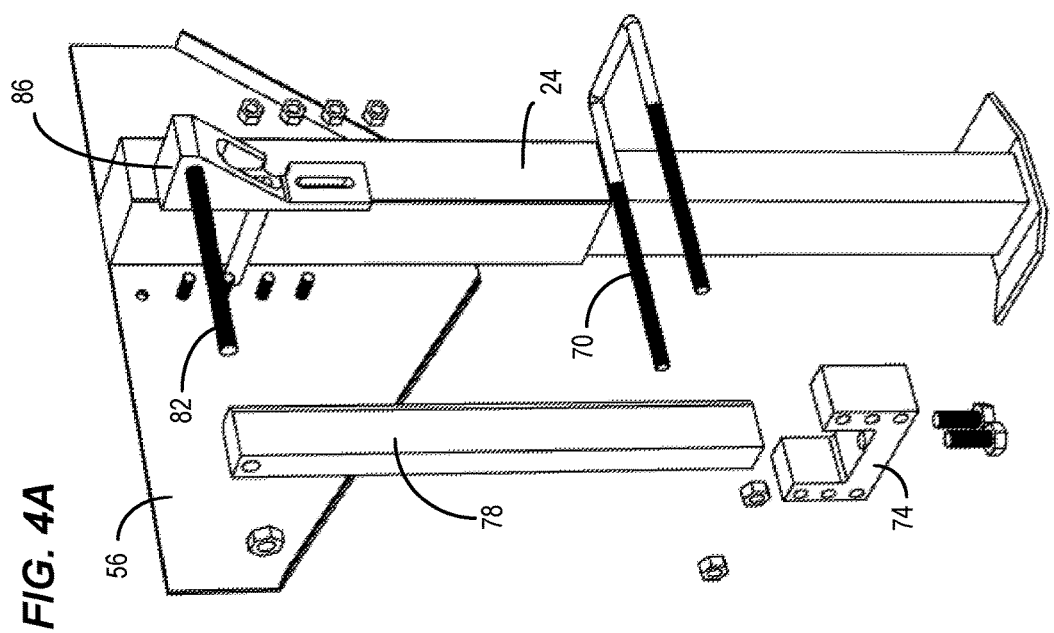

FIGS. 4A-4B depict an alternative embodiment of the front panel holder 40 which utilizes a U-shaped lower threaded member 70 rather than the member 48. This lower threaded member 70 easily slides around the leg of landing gear assembly 24 and bolts into place at a U-shaped element 74. Element 74 attaches to a solid bar 78 which is attached at a top end to an upper threaded member 82. The upper threaded member 82 terminates at a machined or molded metal bracket 86 that is attached to the landing gear brace 56 in a manner similar to that used in the prior example with bolts and nuts. The U-shaped element 74 attaches to the solid bar 78 using one or more bolts that thread into corresponding threaded openings at the lower end of the bar 78. Once assembled, the loop end of the SUGP 36 slides over the bar 78 and is secured into place by tightening the three nuts that draw the SUGP 36 closer to the leg of the landing gear assembly 24. The right-most edge (as illustrated) of the bar 78 may be beveled or rounded to reduce the possibility of wear or tearing of the SUGP 36 in use.

In each case above, the devices depicted are designed for retrofit onto existing trucks. As such, the designs 3A-3B and 4A-4B are sufficiently adaptable to mount onto different types of landing gear assemblies because they rely on attachment points which are consistent between multiple designs. However, the basic mechanism for providing support for a SUGP 36 can be provided with permanent structures that are fabricated as a part of a truck or trailer and thus welded into place or fabricated as a part of the landing gear assembly 24, 56 or the trailer 20 without limitation. Other variations will occur to those skilled in the art upon consideration of the present teachings.

In order to guide the SUGP 36 into proper position; to provide reinforcement and to assure that the SUGP 36 is pulled outward enough to avoid contact with wheel(s) and tire(s); and to provide beneficial aerodynamic effect; one or more central braces 44 are provided as depicted in FIG. 2B and shown in greater detail in FIGS. 5A-5B. This central brace 44 is triangular and in this implementation can be fabricated from three straight members 90, 91, 92, and three sets of brackets 93, 94 and 95 that are used in conjunction with welding, bolting, riveting, structural adhesive, etc. to connect the ends of each of the straight members together to form a triangular shape of about a 45 degree right triangle. The brackets can be bolted, welded, bonded, or riveted to the straight members. The upper straight member is attached to the underside of trailer 20 using a pair of right angle brackets 97 which clamp across the bottom face of a cross member of the truck and are bolted to the central brace. These right angle brackets may contain a flexible member capable of allowing controlled deflection of the central brace. When positioned it is desirable for the brace 44 to extend slightly beyond the edge of the trailer 20 but within non-property carrying dimensional tolerance. The upper edge of the portion extending beyond the edge of trailer can be covered with a roof 99 to reduce aerodynamic drag and to cover sharp edges. While one central brace is depicted in the figures, more than one may be used to achieve greater rigidity of the SUGP 36 and minimize vibration and fluttering of the SUGP 36 at high speeds. As discussed above, the central brace 44 may be connected to the underside of the truck 20 using flexible brackets to enable the brace to rotate within a reasonable range of motion if contacted by a fixed roadway or roadside object.

While the central braces 44 are illustrated as being clamped onto the truck 20, they may be attached in any suitable manner including welding or using other bolting arrangements without limitation. These braces 44 may also be a part of a retrofit kit or may be made a part of an original manufacture of a truck or trailer.

The rear bumper brace gusset (RBBG) 32 of FIG. 2C is depicted in one example in greater detail in FIGS. 6A-6B. In this example, the rear bumper brace gusset RBBG 32 is fabricated as a sheet of steel having an approximately triangular outline on an outer face 102. This outer face may or may not include a central open as shown. Along the top of the gusset 32, a plurality of holes 106 are provided to facilitate attachment of the gusset 32 to a lower portion of the trailer body across a strong location. There is significant variability in rear door frame size and shape, in rear bumper position and location, and in rear marker and warning light design and location. However, these embodiments are sufficiently adaptable to be installed onto any truck with a rear guard that is FMVSS 223/224 compliant. At the lower portion of the RBBG 32, the brace extends inwards at an approximate right angle and rearwards from the face 102 to form a spacer to reach the bumper. In this example, the brace material is bent at an approximate right angle and incorporates another triangular lower face 110. A transitional member 114 is formed by folding the rear face of 102 or by an attachment to the brace face at the edge to provide an interface with the SUGP 36.

The RBBG 32 further incorporates rear side marker lamp 116 and ABS system warning lamp 120 acknowledging that the gusset brace gusset may obscure existing lamps or may require removal of the same during installation. The RBBG 32 further incorporates a member 118 that also extends outward at a right angle and rearward to provide reinforcement to the spacer formed by the first backward extension 110. These two portions form the spacer and are connected together at the area where the bumper will be connected and includes an aperture to accept a bolt. As shown in FIG. 2C, the rear bumper 28 is attached to this RBBG 32 by bolting the RBBG 32 through a hole in the bumper 28 so that the bumper is reinforced at the ends by the RBBG 32 which also serves to effectively extend the width of the bumper 28 further toward the edge of the trailer so as to provide enhanced underride protection when a collision occurs into the side of the truck behind the rear axles or into the rear of the truck near the ends of the bumper 28.

Prior to installation of the RBBG 32 a looped end of the SUGP 36 is threaded around the RBBG 32 so that the RBBG 32 further serves to anchor the SUGP 36 at the rear of the trailer or truck. The installation of the RBBG 32 can then be carried out to affix the RBBG 32 to the bumper 28 and anchor the rear of the SUGP 36. Other mechanisms can also be used to attach an end of the SUGP 36 to the RBBG 32 and/or the front panel holder without limitation. Many variations will occur to those skilled in the art upon consideration of the present teachings.

The present design can be modified and simplified to provide a suitable original equipment design (as opposed to a design that is intended for retrofit) by fabrication of a RBBG 32 as an extension to each side of the bumper which is fabricated as a single part (or as multiple parts that are bolted, formed, or welded together). In such case, each side of the rear bumper can extend further to the left and right than the current rear bumper designs and then interconnect to a brace structure that is attached to the truck body. The structure can further carry any suitable mechanism for the loop at the rear end of the SUGP 36 to attach or for the SUGP 36 to otherwise be attached. Many variations will occur to those skilled in the art upon consideration of the present teachings.

Referring now to FIGS. 7A-7B, an alternative embodiment of RBBG 32 is depicted which has a similar trapezoidal face 122 with apertures 106 at the top for bolting to the trailer 20. This embodiment is again shown as being constructed of metal (e.g., aluminum in one example). However, the parts may be formed out of fiber reinforced composite for example for weight savings and corrosion resistance. At the bottom in this embodiment, a solid mating bracket 126 is bolted to the face 122 so as to provide the spacer function by extending inward (toward the middle of the truck) with the solid metal bracket 126 also extending rearward toward the rear bumper 28. This RBBG 32 can then be installed to the bumper 28 by threading a bolt into a threaded opening 130 to secure the bumper 28 to the RBBG 32.

A further embodiment of RBBG 32 is depicted in FIGS. 8A-8B. In this embodiment, the upper portion of the face 122 is connected to the lower portion of the face 122 by a hinge 134. When the RBBG 32 is attached to the trailer or truck, using this embodiment, the RBBG 32 can be unbolted from the bumper 28 and rotated outward and upward on the hinge in order to allow for replacement of the SUGP 36 and to allow for easy access to the underside of the trailer in this area. A similar hinging or rotating mechanism can be devised for the front panel holder 3A-B 4A-B 12A to permit the entire side underride protection system to be quickly folded up in case the truck or trailer undercarriage needs to be accessed.

In absence of a hinge at either the RBBG 32 or at front panel holder 3A-B or 4A-B or 12A, the SUGP 36 may be loosened by rotation of nuts at threaded rod(s) connected to front panel holder 3A-B or 4A-B or 12A. The SUGP, being composed of flexible fabric, can be lifted away from the underside of the truck and secured to enable access to the underside of the truck. This flexibility of design will enable, for instance, tire inspection and/or replacement while in service.

The RBBG 32, in certain implementations, serves the multiple purposes of providing side extensions and bracing to the rear bumper as well as providing a mounting and anchoring point for the rear of the SUGP 36. In variations, this dual function can be separated and a separate RBBG 32 can be provided as well as a SUGP 36 separate mount structure for the rear of the SUGP 36. Many variations will occur to those skilled in the art upon consideration of the present teachings.

The RBBG 32 is shown in the drawings with a series of holes and matching bolts to attach the reinforcement through the side rail to the trailer cross members. However, the RBBG 32 in all cases may be fabricated without the pattern of holes pre-drilled and can be of sufficient size to allow it to be adaptable to any trailer by drilling appropriate mounting holes at the time of installation. Semi-trailers generally all have similar side rails with ⅜" bolts or rivets. However, the bolt pattern varies as does their location in relation to the horizontal bar of the under ride guard. Some installations may involve removing existing bolts and/or rivets, marking hole locations with the RBBG 32 bolted to the under ride guard, drilling the hole pattern into the RBBG 32 and spacer and then inserting and tightening through bolts with nuts.

The embodiments of FIGS. 3A-3B, 4A-4B, 5A-5B, 6A-6B, 7A-7B, 8A-8B, 11B and 12A may be produced from high strength/weight ratio materials and could be constructed from materials as follows. Front panel holder 3A-3B 4A-4B, 12A; RBBG 6A-6B, 7A-7B, 8A-8B, central brace 5A-5B may be fabricated from aircraft grade aluminum, high strength alloy steel, or fiber reinforced composite, for example. Threaded fasteners may be stainless steel or corrosion resistant coated steel.

It is noted that in some instances (e.g., refrigerated tractor trailer truck designs) fuel tanks may hang below the trailer body near the landing gear. In such cases a remote fuel filler neck can be used to provide access to the fuel tank without need to remove the SUGP 36. Other variations and modifications can be made to accommodate variations encountered in various truck designs without departing from the present teachings.

Referring now to FIG. 9 and detail FIGS. 9A-9B, the SUGP 36 is shown in isolation. At both the front and rear ends, this example of the SUGP 36 is formed into loops 140 and 144 at each end to allow for holding the SUGP 36 into place and for stretching the SUGP 36 taut.

In accord with certain embodiments, the SUGP 36 utilizes steel, aluminum, or fiber reinforced composite front panel holders and RBBG (or rear holders) and a series of elastic fasteners to hold the SUGP 36 in place. The SUGP 36 may be made in many ways to provide for side underride protection. In one embodiment, the SUGP 36 is fabricated from tensioned woven fabric, "webbing". The webbing is a synthetic textile (e.g., woven polyester fibers, glass fibers, nylon fibers, Kevlar™ fibers (a para-aramid synthetic fiber) or aramid fibers, or combinations thereof, etc.) that provides adequate strength and impact resistance. The webbing can be provided with a polymer coating or laminate that forms an outer layer that protects the fibers from weather, ultraviolet light, dirt, etc.

In a first example embodiment of the SUGP 36, a 60 inch tall 14 oz/square yard weight polyester scrim polyvinyl chloride (PVC) coated tarp (rubberized tarp) is folded in half sandwiching 12 inch tall polyester or nylon webbing. In a prototype, the tarp and the polyester or nylon webbing are sewn together with high strength polyester yarn to form a 30 inch tall composite panel that is looped and stitched at both ends as described. The polyester or nylon webbing is angled upwards in the front and rear areas of the panel (and the tarp is trimmed in those areas) to attach to the front and rear mounts to maintain adequate ground clearance. Along the length of the truck or trailer, the webbing is positioned sufficiently close to the ground so as to contact a typical passenger vehicle and thereby prevent underride of the passenger vehicle.

In a second embodiment, a 25-35 inch tall polyester, nylon, aramid, carbon, or glass webbing is coated with PVC or other protective rubber, resin, or plastic. The result is a composite sheet with high strength. PVC coated polyester material is used in football chin straps, for example.

In a third embodiment, the same 12 inch tall polyester webbing as was used in the first embodiment is used, but in this example it relies upon a taller ABS or acrylic or similar plastic sheet for weather and UV protection and aerodynamic effect. The polyester strap fits within a riveted or glued plastic sleeve on the back side of the plastic sheet.

The polyester or nylon webbing used in prototype development as described above is composed of heavy duty sling webbing that was pull tested and rated at 9800 lb/in tensile strength. Such material is available, for example, from Southern Weaving, 1005 W. Bramlett Road, Greenville, S.C. 29611. Such webbing can, for example, also be produced as two ply polyester with gut in 12 inch widths to provide tensile strength of 117,600 pounds minimum as product 1980 ZP 12".

The SUGP 36 and the associated trailer mounts are designed to resist penetration by a passenger vehicle. The SUGP 36 forms an impact barrier through tension throughout the panel which is transmitted to structural members of the truck body (the landing gear 24, cross members, and rear door frame and underride guard) by bolt on mounts. The collision performance of the system is determined by the tensile strength and toughness of the SUGP 36, and the stiffness and strength of the front and rear mount panels 40 and 36 and the central brace 44.

Due to the considerations of weight and impact speed, collisions with pedestrians, cyclists, and even motorcyclists will not require as much energy dissipation and SUGP 36 strength as a passenger vehicle will—even at relatively modest closing velocities. As a conservative estimate, tensile strength on the order of 10,000 to 12,000 pounds should be adequate to provide underride protection to pedestrians, cyclists and motorcyclists under most circumstances, so the SUGP 36 strength, can be reduced accordingly (from the estimated 90,000 to 120,000 pound minimum tensile strength as will be discussed later) if it is only desired to provide protection to pedestrians, cyclists and motorcyclists (e.g., in an urban setting). The energy that is to be dissipated to prevent underride is directly related to the weight of the striking vehicle and are proportional to the square of the striking vehicle's velocity. The forces that are developed in the SUGP 36 and mounts are a combination of the preload tension and the impulse of the striking vehicle.

Fortunately, in a majority of high closing speed underride collisions, the passenger vehicle is moving in a forward orientation towards the larger commercial vehicle. In this case, the passenger vehicle's front bumper will engage the SUGP 36 approximately 2-5 feet before the occupant compartment (the greenhouse) contacts the side of the truck. It is over this distance that the SUGP 36 decelerates the striking vehicle sufficiently that the occupant compartment is not breached or significantly deformed by contact with the truck body.

Calculations indicate that the SUGP 36 will absorb enough energy (approximately 120,000 ft-lb) to stop a 3,000 lb vehicle that was initially traveling at 35 mph if the SUGP can withstand 120,000 lb of tension. A 12 inch tall×0.25 inch thick woven polyester webbing relied upon in the prototype discussed in this application was selected because it has sufficient strength as calculated above (it is rated at a working load limit of 9,800 lb/inch height). Other embodiments may use a taller woven textile panel (potentially 30-40 inches) instead of the 12 inch panel. This taller panel may be composed of thinner webbing to arrive at similar performance without substantial weight penalty.

During the collision discussed above, the SUGP 36 will strain approximately 3-4% during the compression phase of the collision depending on panel material, tension in the weave, and preload applied. Proper preload (approximately 1-3%) allows the SUGP 36 to develop sufficient resistive forces and decelerate a striking vehicle sufficiently to avoid occupant compartment intrusion.

The above calculations assume that the SUGP 36 attachment points to the truck have adequate structural integrity to support the SUGP 36 without failure of the support mechanism. These panel mounts are projected to plastically deflect the trailer structure during the collision before the SUGP 36 reaches its tensile limit. Fortunately, bending (and potential failure) of the mounting structures can assist in dissipating collision energy and in preventing the SUGP 36 from bouncing a vehicle away from the truck at dangerous speeds. Given the limitations in the anchor points for the front panel holder, the central brace, and the rear bumper brace gusset and panel mount, conservative analysis indicates that the system will prevent underride up to approximately a 25 mph closing velocity depending on vehicle weight and collision angle. At 25 mph closing velocity, the SUGP panel 36 will only need to withstand approximately 90,000 lb maximum tensile load. When quoting tensile loadings in the SUGP 36 and associated mounts, it should be noted that these collision loads are momentary. Structures often exhibit increased stiffness and strength during this type of dynamic loading compared to the performance of the same systems undergoing quasi-static loading. Accordingly, the performance capabilities of the system may in fact exceed what has been predicted by the quasi-static analysis described above.

In the embodiments described above, all of the example SUGPs achieve a creep resistant, flexible panel of high strength, chemical resistance, and durability. In each case, the designs rely upon tension in the synthetic webbing to resist significant motion when subjected to aerodynamic forces (cross winds/turbulence, etc.) or collision forces (intrusion from a vehicle, bicyclist, or pedestrian.) The SUGP 36 design can also each include grommets 152 along the top edge for rubber tarp straps (e.g., Ethylene Propylene Diene Monomer (EPDM) cords with hooks) to secure the top of the panel to the underside of the trailer or straight truck as shown in detail in FIG. 9C. This provides a flexible connection that holds the fabric side underride panel into place at a top edge thereof. In other embodiments, any other suitable mechanism for attaching the top edge of the SUGP 36 to the side of the truck or trailer can be used if desired.

The system is designed with sufficient compliance, toughness, and abrasion resistance in order that the SUGP 36 will not sustain permanent damage if contacted with fixed roadway or roadside protuberances such as a cable box or fire hydrant.

The size and shape of all three design examples of the SUGP 36 can generally be about the same (approximately 30-35 inches tall along most of the length of the truck or trailer reducing to approximately 20-25 inches at the front and rear mounts). A small rubber "runner" or "skirt" 160 along the bottom edge may be used to further reduce ground clearance for enhanced aerodynamic effect as shown in detail in FIG. 9C. Such runner may be approximately 3-5" tall and can be made of EPDM (ethylene propylene diene monomer) for example.

The textile webbing of the SUGP 36 has been pull tested to a rated tensile strength of about 117,000 lb for 12 inch polyester or nylon, and between 6 and 8% ultimate elongation depending on composition. Analysis indicates that the polyester and nylon webbing is sufficiently strong to prevent passenger compartment intrusion (PCI) when struck by a 3000 lb vehicle traveling at 35 mph given any intrusion angle. The actual crash performance of the system is highly dependent on the strength of the front and rear mount points and of the landing gear assembly in the semi-trailer application. Prototype testing indicates that approximately 1-3% strain is sufficient preload to prevent significant oscillation of the SUGP at highway speeds up to about 75 mph. Testing at that preload indicates that pedestrians and cyclists will not experience significant penetration or underride before being redirected away from the truck underbody. Hence, it is desirable to preload the prototype SUGP 36 to approximately 1%-3% strain so as to create a resilient collision guard in the area below the sides of the truck.

The overall system should still allow some of the vehicle to pass beneath the truck or trailer ("underride of 2-5 ft"), but the system should slow the vehicle down sufficiently after that travel distance to prevent the trailer or truck body from crushing or tearing apart the occupant compartment. The system will prevent pedestrian/bicyclist underride (except for a few inches) and will prevent vehicle PCI.

In the present system, the tensioned flexible SUGP 36, the front panel bracket, and the rear bumper brace mount system should preferably have sufficient strength to redirect away from the underside of the truck a pedestrian or cyclist who strikes the guard at any speed or angle. The tensioned flexible side underride guard panel, the front panel bracket, and the rear bumper brace should also preferably be strong enough to absorb the kinetic energy of a 3,000 lb passenger vehicle strike when the vehicle is traveling at 25-35 mph so as to prevent passenger compartment intrusion.

It is noted that the SUGP 36 may creep and loosen over time depending on material used. This may be compensated for by periodic adjustment of the pre-load tension in the manner discussed previously. In the event it becomes impossible to provide adequate preload to the SUGP 36 using the threaded rod mechanism, the SUGP 36 should be replaced. However, it is noted that the tensioning mechanism embodied by the simple embodiments described above for tensioning the SUGP 36 using threaded rods and bolts could instead be realized in an embodiment that utilizes a ratcheting mechanism in which the SUGP 36 is taken up on a ratcheting roller that can provide a wider degree of adjustability. Many other variations of tensioning mechanisms can be used without limitation.

The above discussion has been illustrated using the present system attached to a tractor trailer type trailer. However, the same principles can be utilized to create a safer single unit truck (SUT). The SUT system may not be as capable of preventing PCI in high speed vehicular collisions as the semi-trailer system due to lack of available high strength mounting points such as the landing gear and FMVSS 223/224 rear guard that are available on a semi-trailer. However, the present teachings can be applied to a SUT or "box truck" to provide side underride protection to prevent cyclists and pedestrians from encountering the truck body and/or wheels—particularly in an urban environment. The straight truck design will also offer a measure of side underride resistance to medium and low speed vehicle collisions. However, it is possible to brace a SUT so that the full benefits of the underride protection system described herein can be obtained for such trucks too.

Referring now to FIG. 10, a SUT 200 is illustrated carrying a SUGP 36 that is configured in a manner similar to that of the semi-trailer embodiments illustrated above. FIG. 11 shows examples of the assembly exploded with inset FIGS. 11A-11B broken out to depict the details thereof. At the rear of the truck, it is desirable that a RBBG 32 be used as described previously and shown in FIG. 11B. However, it is noted that the design of rear underride bumpers 204 are less standardized for use on SUTs. Hence, the design of a RBBG 32 may vary dimensionally from that of the RBBG 32 used in a semi-trailer, but the principle is the same. Additionally, it is noted that the RBBG 32 has the dual function of holding the rear end of the SUGP 36. This function can be addressed without need for any attachment to the rear bumper 204. While this provides less impact resistance than if the RBBG 32 bridges the gap in the bumper to the SUT body, the system nevertheless enhances side underride protection—particularly in an urban setting where impact speeds are lower and chances of side impact with a bicycle or pedestrian are higher.

FIG. 11A shows an example embodiment of a front panel holder 208 that is adapted for use in a SUT where front landing gears are not present. This front panel holder 208 is configured to attach directly to cross members of the body through the side rail and is shown in greater detail in FIGS. 12A-12B. The holder 208 is made up of a face plate 212 that is approximately trapezoidal in shape with a front-most edge that extends downward from the truck body. This face plate 212 is bolted to the side of the truck 200 near the front and is held rigid in place with bolted connections into the SUT cross members and a lateral brace 216 that is designed to assist the face plate in resisting inward movement in the event of a side impact. A U-shaped threaded rod 220 passes through mating holes in the lateral brace 216 to provide an adjustable mounting structure for the SUGP 36. The rod 220 passes through the loop at the front end of the SUGP 36 and the threaded rod's position with respect to the backer brace 216 is adjusted with the nuts 224 so as to pull the SUGP 36 taut. This design causes the SUGP 36 to be wrapped across the front panel holder to a forward and inboard position aiding in aerodynamic effect and preventing the SUGP from snagging on objects close to the edge of the truck. The SUGP 36 is of similar design as those previously discussed with the length being adjusted to the appropriate dimensions for the SUT application.

Thus, in accord with certain example embodiments, an underride collision protection system for a truck has a rear bumper brace guard coupled to a truck body that extends a rear bumper toward and couples the rear bumper to a side edge of the truck. A front panel bracket is coupled to the truck body. A flexible fabric side underride guard panel has a front end and a rear end. The front panel bracket and the rear bumper brace hold the fabric side underride panel into place at the front end and rear end respectively. A stretching mechanism is used to pull the side underride guard panel taut between the front end and the rear end.

In certain example embodiments, the front panel bracket is attached to a landing gear assembly forming a part of the truck. In certain example embodiments, a central brace is coupled to the truck and which urges the flexible fabric side underride guard panel outward from the underside of the truck. In certain example embodiments, a runner is attached along a bottom edge of the flexible fabric side underride guard panel. In certain example embodiments, the flexible fabric side underride guard panel is tensioned to a preload of approximately 1-3% strain to create a resilient collision guard in the area below the sides of the truck. In certain implementations, the tensioned flexible side underride guard panel, the front panel bracket, and the rear bumper brace have adequate strength to absorb kinetic energy produced by a 3,000 lb passenger vehicle striking the flexible side underride guard panel traveling at 25 mph to prevent damage to the vehicle's passenger compartment. In certain implementations, the fabric side underride panel has adequate strength to withstand a 90,000 pound tensile load; while in others, the fabric side underride panel has adequate strength to withstand a 120,000 pound tensile load; and in others only 10,000 to 12,000 pound tensile load. In certain example embodiments, the flexible fabric side underride guard panel is comprised of woven polyester, nylon, glass, aramid, or carbon fibers secured to a protective tarp. In certain example embodiments, the fibers are woven and coated, impregnated, or laminated with an ultraviolet light stabilized plastic, rubber, polymer or resin. In certain example embodiments, a flexible connection holds the fabric side underride panel into place along a top edge thereof.

In another example embodiment, an underride collision protection system for a truck has a rear panel mount 32 coupled to a truck body or rear bumper 28 at a rear of the truck 20. A front panel bracket 40 is coupled to the truck body. A flexible fabric side underride guard panel 36 has a front end and a rear end. The front panel bracket and the rear panel mount hold the fabric side underride panel into place at the front end and rear end respectively. A stretching mechanism pulls the side underride guard panel 36 taut between the front end and the rear end.

In certain example embodiments, the rear panel mount forms a part of a rear bumper gusset assembly 32 that connects sides of the rear bumper to the truck body. In certain example embodiments, the front panel bracket is attached to a landing gear assembly forming a part of the truck. In certain example embodiments, a central brace that is coupled to the truck and which urges the fabric side underride guard panel 36 outward from the underside of the truck. In certain example embodiments, a runner is attached along a bottom edge of the fabric side underride guard panel. In certain example embodiments, the fabric side underride guard panel 36 is tensioned to a preload of approximately 1-3% strain. In certain implementations, the tensioned flexible side underride guard panel, the front panel bracket, and the rear bumper brace have adequate strength to absorb kinetic energy produced by a 3,000 lb passenger vehicle striking the flexible side underride guard panel traveling at 25 mph to prevent underride of the vehicle's passenger compartment. In certain implementations, the fabric side underride panel has adequate strength to withstand a 90,000 pound tensile load; while in others, the fabric side underride panel has adequate strength to withstand a 120,000 pound tensile load; and in others only 10,000 to 12,000 pound tensile load. In certain example embodiments, the fabric side underride guard panel is comprised of woven polyester, nylon, glass, aramid, or carbon fibers laminated to or otherwise secured to a protective tarp. In certain example embodiments, the fibers are woven and coated, impregnated, or laminated with an ultraviolet light stabilized plastic, rubber, polymer or resin. In certain example embodiments, a flexible connection holds the fabric side underride panel into place along a top edge thereof.

In accord with certain example implementations, a retrofit kit for underride protection for a truck has a rear panel mount 32 configured for attachment to a truck body or rear bumper at the rear of the truck. A front panel bracket 40 or 208 is configured for attachment to the truck body. A flexible fabric side underride guard panel 36 has a front end and a rear end. The front panel bracket and the rear panel mount are configured to hold the fabric side underride panel at the front end and rear end respectively. A stretching mechanism 40 or 208 is configured to pull the side underride guard panel taut between the front end and the rear end. In certain implementations, the fabric side underride panel has adequate strength to withstand a 90,000 pound tensile load; while in others, the fabric side underride panel has adequate strength to withstand a 120,000 pound tensile load; and in others only 10,000 to 12,000 pound tensile load.

In certain example embodiments, the rear panel mount forms a part of a rear bumper gusset assembly that is configured to connect sides of the rear bumper 28 to the truck body. In certain example embodiments, the front panel bracket is configured for attachment to a landing gear assembly forming a part of the truck. In certain example embodiments, a central brace 44 is configured for attachment to the truck at a location between the front panel bracket 40 and the rear panel mount 32 to urge the flexible fabric side underride guard panel 36 outward from the underside of the truck. In certain example embodiments, a runner that is attached or attachable along a bottom edge if the flexible fabric side underride guard panel 36. In certain example embodiments, the flexible fabric side underride guard panel is comprised of woven polyester, nylon, glass, aramid, or carbon fibers laminated to or otherwise secured to a protective tarp. In certain example embodiments, the fibers are woven and coated, impregnated, or laminated with an ultraviolet light stabilized plastic, rubber, polymer or resin. In certain example embodiments, a flexible connection that holds the fabric side underride panel into place along a top edge thereof.

An example implementation of an underride collision protection system for a truck has a rear bumper brace guard 32 attached to a truck body that extends a rear bumper 28 toward and couples the rear bumper to a side edge of the truck. A front panel bracket 40 is attached to the truck body, where the front panel bracket is attached to a landing gear assembly 24 forming a part of the truck. A flexible fabric side underride guard panel 36 has a front end and a rear end and having a runner attached along a bottom edge thereof. The flexible fabric side underride guard panel is comprised of a fabric made of at least one of polyester fibers, nylon fibers, glass fibers, aramid fibers, and carbon fibers, and where the fabric is coated, laminated, or impregnated with ultraviolet stabilized rubber, plastic, polymer or resin. The front panel bracket and the rear bumper guard hold the fabric side underride panel into place at the front end and rear end respectively. A flexible connection holds the fabric side underride panel into place along a top edge thereof. A stretching mechanism forming a part of 40 or 208 is attached to the front panel bracket that pulls the side underride guard panel taut between the front end and the rear end thereof to a preload of approximately 1-3% strain. A central brace 44 is coupled to the truck and urges the flexible fabric side underride guard panel 36 outward from the underside of the truck. In certain implementations, the fabric side underride panel has adequate strength to withstand a 90,000 pound tensile load; while in others, the fabric side underride panel has adequate strength to withstand a 120,000 pound tensile load; and in others only 10,000 to 12,000 pound tensile load.

It is noted that no central brace is shown in this illustration in connection with a SUT 200, but a central brace of design similar to that shown in connection with a semi-trailer can be used if desired or required to guide the SUGP 36 around the rear wheel(s). Many other variations will occur to those skilled in the art upon consideration of the present teachings.

All references, including publications, patent applications, patents, and website content cited herein are hereby incorporated by reference to the same extent as if each reference were individually and specifically indicated to be incorporated by reference and was set forth in its entirety herein.

While certain illustrative embodiments have been described, it is evident that many alternatives, modifications, permutations and variations will become apparent to those skilled in the art in light of the foregoing description.

What is claimed is:

1. An underride collision protection apparatus for a truck, comprising:
    a rear bumper brace guard coupled to a side of a truck body that extends a rear bumper toward the side of the truck body and couples the rear bumper to the side of the truck body to provide enhanced underride protection for collisions occurring behind rear axles of the truck, the rear bumper brace guard including a face element configured for engagement with the side of the truck body and a mating member extending inward from the face element to project toward the rear bumper when the face element is engaged with the side of the truck body;
    a flexible fabric side underride guard panel having a front end and a rear end;
    the rear bumper brace guard holding the flexible fabric side underride guard panel into place at the rear end; and
    a stretching mechanism that pulls the flexible fabric side underride guard panel taut between the front end and the rear end.

2. The apparatus according to claim 1, further comprising a front panel bracket coupled to the truck body to hold the flexible fabric side underride guard panel into place at the front end, where the front panel bracket is attached to a landing gear assembly forming a part of the truck.

3. The apparatus according to claim 1, further comprising a central brace that is coupled to the truck and which urges the flexible fabric side underride guard panel outward from an underside of the truck.

4. The apparatus according to claim 1, further comprising a runner that is attached along a bottom edge of the flexible fabric side underride guard panel.

5. The apparatus according to claim 1, where the flexible fabric side underride guard panel is tensioned to a preload of approximately 1-3% strain.

6. The apparatus according to claim 1, where the flexible fabric side underride guard panel is comprised of woven polyester, nylon, glass, aramid, or carbon fibers secured to a protective tarp.

7. The apparatus according to claim 6, where fibers of the flexible fabric side underride guard panel are woven and coated, impregnated, or laminated with an ultraviolet light stabilized plastic, rubber, polymer, or resin.

8. The apparatus according to claim 1, further comprising a flexible connection that holds the flexible fabric side underride panel into place along a top edge thereof.

9. The apparatus according to claim 1, where the flexible fabric side underride panel has adequate strength to withstand at least a 10,000 pound tensile load.

10. An underride collision protection apparatus for a truck, comprising:
    a bumper brace guard including a face element coupled to a side of a truck body and a mating member extending inward and rearward from the face element to couple with a rear bumper of the truck at a rear of the truck, the bumper brace guard extending the rear bumper of the truck toward the side of the truck body;
    a front panel bracket coupled to the truck body;
    a flexible fabric side underride guard panel having a front end and a rear end;
    the front panel bracket and the bumper brace guard holding the flexible fabric side underride panel into place at the front end and rear end respectively; and
    a stretching mechanism that pulls the flexible fabric side underride guard panel taut between the front end and the rear end.

11. The apparatus according to claim 10, where the bumper brace guard forms a part of a rear bumper brace gusset assembly that connects sides of the rear bumper to the truck body.

12. The apparatus according to claim 10, where the front panel bracket is attached to a landing gear assembly forming a part of the truck.

13. The apparatus according to claim 10, further comprising a central brace that is coupled to the truck and which urges the flexible fabric side underride guard panel outward from an underside of the truck.

14. The apparatus according to claim 10, further comprising a runner that is attached along a bottom edge of the flexible fabric side underride guard panel.

15. The apparatus according to claim 10, where the flexible fabric side underride guard panel is tensioned to a preload of approximately 1-3% strain.

16. The apparatus according to claim 10, where the flexible fabric side underride guard panel is comprised of woven polyester, nylon, glass, aramid, or carbon fibers laminated to or otherwise secured to a protective tarp.

17. The apparatus according to claim 16, where fibers of the flexible fabric side underride guard panel are woven and coated, impregnated, or laminated with an ultraviolet light stabilized plastic, rubber, polymer, or resin.

18. The apparatus according to claim 10, further comprising a flexible connection that holds the flexible fabric side underride panel into place along a top edge thereof.

19. A retrofit kit of parts for retrofitting a truck for enhanced underride protection, the retrofit kit of parts comprising:
a bumper brace guard including a face element configured for attachment to a side of a truck body and a mating member extending inward and rearward from the face element, the mating member configured for bolted attachment to a rear bumper of the truck at the rear of the truck;
a front panel bracket configured for attachment to the truck body;
a flexible fabric side underride guard panel having a front end and a rear end;
the front panel bracket and the bumper brace guard configured to hold the flexible fabric side underride panel at the front end and rear end respectively; and
a stretching mechanism that is configured to pull the flexible fabric side underride guard panel taut between the front end and the rear end.

20. The retrofit kit of parts according to claim 19, where the bumper brace guard forms a part of a rear bumper brace gusset assembly that is configured to connect sides of the rear bumper to the truck body.

21. The retrofit kit of parts according to claim 19, where the front panel bracket is configured for attachment to a landing gear assembly forming a part of the truck.

22. The retrofit kit of parts according to claim 19, further comprising a central brace that is configured for attachment to the truck at a location between the front panel bracket and the bumper brace guard to urge the flexible fabric side underride guard panel outward from an underside of the truck.

23. The retrofit kit of parts according to claim 19, further comprising a runner that is attached to or configured for attachment along a bottom edge of the flexible fabric side underride guard panel.

24. The retrofit kit of parts according to claim 19, where the flexible fabric side underride guard panel is comprised of woven polyester, nylon, glass, aramid, or carbon fibers laminated to or otherwise secured to a protective tarp.

25. The retrofit kit of parts according to claim 24, where fibers of the flexible fabric side underride guard panel are woven and coated, impregnated, or laminated with an ultraviolet light stabilized plastic, rubber, polymer, or resin.

26. The retrofit kit of parts according to claim 19, further comprising a flexible connection that holds the flexible fabric side underride panel into place along a top edge thereof.

27. The retrofit kit of parts according to claim 19, where the flexible fabric side underride panel has adequate strength to withstand at least a 10,000 pound tensile load.

28. An underride collision protection apparatus for a truck, comprising:
a rear bumper brace gusset configured for attachment to a side of a truck body and connection to a rear underride protection bumper of the truck to enhance strength of the rear underride protection bumper, the rear bumper brace gusset comprising:
a face element having an outward face and an inward face configured for engagement with the side of the truck body;
the face element having an array of apertures along a top edge thereof for accepting a plurality of fasteners to attach the face element to the side of the truck body;
a mating member coupled to the face element, the mating member extending inward from the face element at an angle such that the mating member is projecting toward the rear underride protection bumper when the rear bumper brace gusset is attached to the side of the truck body; and
the mating member being configured for connection to a rear bumper of the truck to thereby couple the rear bumper of the truck to the rear bumper brace gusset.

29. The apparatus according to claim 28, further comprising:
a front panel bracket attached to the truck body near a front end thereof;
a flexible fabric side underride guard panel having a front end and a rear end and having a runner attached along a bottom edge thereof, where the flexible fabric side underride guard panel has adequate strength to withstand a 10,000 pound tensile load;
the front panel bracket and the rear bumper brace gusset holding the fabric side underride panel into place at the front end and rear end respectively; and
a stretching mechanism that pulls the side underride guard panel taut between the front end and the rear end thereof to a preload of approximately 1-3% strain.

30. The apparatus according to claim 29, where the front panel bracket is attached to a landing gear assembly forming a part of the truck.

31. The apparatus according to claim 29, further comprising a central brace that is coupled to the truck and which urges the flexible fabric side underride guard panel outward from an underside of the truck.

32. The apparatus according to claim 29, further comprising a flexible connection holding the flexible fabric side underride panel into place along a top edge thereof.

33. The apparatus according to claim 29, where the flexible fabric side underride guard panel is comprised of a fabric made of at least one of polyester fibers, nylon fibers, glass fibers, aramid fibers, and carbon fibers, and where the fabric is coated, laminated, or impregnated with ultraviolet stabilized rubber, plastic, polymer, or resin.

34. The apparatus according to claim 28, where the angle that the mating member extends inward from the face element is substantially a right angle, and where the mating member also extends rearward from the face element to reach the rear underride protection bumper when the rear bumper brace gusset is attached to the side of the truck body.

35. The apparatus according to claim 1, where the mating member extends inward from the face element at substantially a right angle, and where the mating member also extends rearward from the face element to reach the rear bumper when the face element is engaged with the side of the truck body.

36. The apparatus according to claim 10, where the mating member extends inward from the face element at substantially a right angle.

37. The retrofit kit of parts according to claim 19, where the mating member extends inward from the face element at substantially a right angle.

* * * * *